(12) United States Patent
Kawano

(10) Patent No.: US 7,054,236 B2
(45) Date of Patent: May 30, 2006

(54) OPTICAL DISK DRIVE APPARATUS, OPTICAL PICKUP, MANUFACTURING METHOD THEREFOR AND ADJUSTING METHOD THEREFOR

(75) Inventor: Noriyuki Kawano, Tokyo (JP)

(73) Assignee: TDK Corporation, Tokyo (JP)

( * ) Notice: Subject to any disclaimer, the term of this patent is extended or adjusted under 35 U.S.C. 154(b) by 534 days.

(21) Appl. No.: 10/327,110

(22) Filed: Dec. 24, 2002

(65) Prior Publication Data

US 2003/0117909 A1    Jun. 26, 2003

(30) Foreign Application Priority Data

Dec. 26, 2001    (JP)    ............................. 2001-393894

(51) Int. Cl.
*G11B 7/095* (2006.01)
(52) U.S. Cl. .................................. 369/44.16; 369/44.15
(58) Field of Classification Search ............ 369/44.15, 369/44.16, 44.32
See application file for complete search history.

(56) References Cited

U.S. PATENT DOCUMENTS

| 6,282,161 | B1 |  | 8/2001 | Son et al. |
| 6,501,710 | B1 | * | 12/2002 | Yokoyama et al. ...... 369/44.14 |
| 6,580,569 | B1 | * | 6/2003 | Choi et al. ................ 359/814 |
| 6,665,238 | B1 | * | 12/2003 | Onozawa et al. ........ 369/44.15 |
| 6,714,491 | B1 | * | 3/2004 | Ke et al. ................... 369/44.11 |
| 6,801,493 | B1 | * | 10/2004 | Jang et al. .................... 369/221 |
| 6,853,608 | B1 | * | 2/2005 | Wade et al. ............. 369/44.15 |
| 6,917,386 | B1 | * | 7/2005 | Ito et al. ...................... 348/348 |

FOREIGN PATENT DOCUMENTS

| CN | 1244702 A | 2/2000 |
| JP | 7-65397 | 3/1995 |
| JP | 11-66587 | 3/1999 |
| JP | 11-283258 | 10/1999 |
| JP | 11-306548 | 11/1999 |
| JP | 2001-273659 | 10/2001 |

* cited by examiner

*Primary Examiner*—Hoa T. Nguyen
*Assistant Examiner*—Adam R. Giesy
(74) *Attorney, Agent, or Firm*—Oblon, Spivak, McClelland, Maier & Neustadt, P.C.

(57) ABSTRACT

An optical disk drive apparatus has an objective lens which converges a light beam to direct it to an optical disk, an objective lens support, an elastic support member which movably supports the objective lens on the objective lens support portion, and a coil and a magnet. The coil and magnet are capable of moving the objective lens against an elastic force of the elastic support member relative to the objective lens support portion so as to vary an angle of incidence of the light beam emitted from the objective lens with respect to an irradiated surface of the optical disk. The angle of incidence is adjusted by an electric power supplied to the coil.

15 Claims, 12 Drawing Sheets

OPTICAL DISK DRIVE APPARATUS, OPTICAL PICKUP, MANUFACTURING METHOD THEREFOR AND ADJUSTING METHOD THEREFOR

BACKGROUND OF THE INVENTION

1. Field of the Invention

The present invention relates to an optical disk drive apparatus and an optical pickup for irradiating a recording medium (or storage medium), in the form of an optical disk such as a compact disk (CD), a digital versatile disk (DVD) or in the form of a magneto-optical disk such as a mini disk (MD), with a light beam to perform optical processing (e.g. reading or writing of data). The present invention also relates to a method for manufacturing an optical disk drive apparatus or an optical pickup and a method for adjusting an optical disk drive apparatus or an optical pickup.

2. Description of the Related Art

Generally, in an optical disk drive apparatus, the quality of a recording signal directed to an optical disk (i.e. a recording medium, which will be sometimes referred to simply as a "disk" hereinafter) and the quality of a reproduction signal produced from the disk is greatly affected by the degree of perpendicularity (or skew) of the optical pickup relative to the irradiated surface (e.g. the recording surface side or its reverse side) of the disk to which an optical beam is directed. In view of this fact, it has been proposed, as disclosed in Japanese Patent Application Laid-Open No. 11-306548, to provide a skew adjustment mechanism in the optical disk drive so as to adjust the skew by means of the skew adjustment mechanism provided in the optical disk drive upon mounting an optical pickup on the optical disk drive so that a required degree of perpendicularity would be obtained.

Specifically, an example of a conventional optical disk drive apparatus is shown in FIG. 11, in which a tray 2 on which a disk 1 is to be placed is mounted on a main chassis 3 in such a way as to be capable of being loaded into and unloaded from the main chassis 3 in the direction designated by a double sided arrow A-B in FIG. 11, by means of a loading/unloading mechanism (not shown). In the main chassis 3, there is also provided a mechanical unit 5 including mechanical chassis 4 on which a disk recording and reproducing mechanism and other mechanisms are packaged or mounted.

On the mechanical chassis 4, there is mounted a disk motor (or a spindle motor) 6, an optical pickup 7 and an optical pickup feed (or advancing) mechanism 8 for moving the optical pickup 7 in the tracking direction. A turntable 9 on which a disk 1 is placed so as to be rotated is mounted on an output shaft of the disk motor 6.

The optical pickup 7 is supported on a main shaft 10 and a sub-shaft 11 serving as two guide shafts mounted on the mechanical chassis 4 via a skew adjustment mechanism. The optical pickup 7 is movable relative to the main shaft 10 and the sub-shaft 11, that is, relative to the mechanical chassis, in the axial direction (which coincides with the tracking direction) of the main shaft 10 and the sub-shaft 11.

In the following, the skew adjustment mechanism in the conventional apparatus will be described with reference to FIGS. 11 and 12.

As shown in FIGS. 11 and 12, the main shaft 10 is supported on the mechanical chassis 4 via an inclination adjustment fulcrum 10A near one end thereof and via an inclination adjustment point 10B near the other end thereof. On the other hand, the sub-shaft 11 is supported on the mechanical chassis 4 via an inclination adjustment point 11A near one end thereof and via an inclination adjustment point 11B near the other end thereof.

The inclination adjustment fulcrum 10A is adapted to support the main shaft 10 in such a way that the main shaft 10 is pivotable in a direction perpendicular to the plane of the sheet of FIG. 11. The inclination adjustment point 10B is adapted to support the main shaft 10 via a height adjustment mechanism 12 in the form of a screw mechanism, a cam mechanism or the like so as to be capable of adjusting the position with respect to the height direction (see FIGS. 11 and 12) of the main shaft 10 near the inclination adjustment point 10B, relative to the mechanical chassis 4.

On the other hand, the inclination adjustment points 11A and 11B are adapted to support the sub-shaft 11 via height adjustment mechanisms 13A and 13B in the form of screw mechanisms, cam mechanisms or the like so as to be capable of adjusting the position with respect to the height direction of the sub-shaft 11 near the inclination adjustment points 11A and 11B, relative to the mechanical chassis 4.

In the above described apparatus, skew adjustment in the tangential direction shown in FIG. 12 (that is, adjustment of inclination of the optical axis with respect to the disk surface as seen from the moving trajectory direction (i.e. tracking direction) of a light spot (or an objective lens 15) on the disk surface) is attained by operating the height adjustment mechanism 13A at the inclination adjustment point 11A and the height adjustment mechanism 13B at the inclination adjustment point 11B of the sub-shaft by the same shift amount, in the same direction.

On the other hand skew adjustment in the radial direction shown in FIG. 12 (that is, adjustment of inclination of the optical axis with respect to the disk surface as seen from the direction orthogonal to the moving trajectory direction of a light spot on the disk surface) is attained by operating the height adjustment mechanism 12 at the inclination adjustment point 10B of the main shaft 10 and the height adjustment mechanism 13B at the inclination adjustment point 11B of the sub-shaft by the same shift amount, in the same direction.

In the conventional apparatus in which the skew adjustment is performed by means of the skew adjustment mechanism as disclosed in Japanese Patent Application Laid-Open No. 11-306548, in the case in which relatively large skew adjustment is required, the distance between the objective lens 15 and the lower surface of the disk 1 greatly varies between the inner portion and the outer portion of the disk 1. So it is necessary to provide a large movable range for a movable portion 17 of an actuator 16 for moving the objective lens 15 in the height direction, in order to allow adequate adjustment (i.e. focus adjustment) of the distance (i.e. working distance W.D.) between the objective lens 15 and the lower surface of the disk 1 and to cope with surface runout (or wobbling) of the disk 1, as shown in FIG. 13.

Consequently, it is necessary to make the dimension of the movable portion 17 and the actuator large in the height direction, and that the dimension of the optical pickup 110 becomes necessarily large. So it is difficult to reduce the size and weight of the optical disk drive apparatus.

Furthermore, since the above-described conventional apparatus uses various mechanisms such as mechanisms for adjusting the heights of the height adjustment points 10B, 11A and 11B of the main shaft 10 and the sub-shaft 11, the number of parts becomes large and the structure of the apparatus becomes complex. In addition, the skew adjusting operation, which requires mechanical adjustment, is also complicated. Therefore it is actually difficult to achieve size reduction, improvement in productivity and cost reduction of the optical disk drive apparatus.

SUMMARY OF THE INVENTION

The present invention has been made in view of the above-described state of the art, and an object thereof is to provide an optical disk drive apparatus with a simple and low cost structure in which skew adjustment can be performed easily while allowing size reduction and weight reduction. It is also an object of the invention to provide an optical pickup that can be used in the optical disk drive apparatus, a method for manufacturing the optical disk drive apparatus and the optical pickup and a method for adjusting the optical disk drive apparatus and the optical pickup.

To achieve the objects, the optical disk drive apparatus according to the present invention comprises:

an objective lens which converges a light beam to direct it to an optical disk;

an objective lens support portion for supporting the objective lens on a chassis of the optical disk drive apparatus;

an elastic support member which movably supports the objective lens on the objective lens support portion; and a coil and a magnet, one of which is provided substantially integral with the objective lens and another of which is mounted on the objective lens support portion independently from the objective lens, the coil and the magnet being capable of moving, by an interaction of the coil and the magnet caused by supplying electric power to the coil, the objective lens against an elastic force of the elastic support member relative to the objective lens support portion so as to vary an angle of incidence of the light beam emitted from the objective lens with respect to an irradiated surface of the optical disk;

wherein, as said angle of incidence, at least one of a radial direction tilt angle as a tilt angle of an optical axis with respect to the irradiated surface of the disk as seen from a direction perpendicular to a tracking direction and a tangential direction tilt angle as a tilt angle of the optical axis with respect to the irradiated surface of the disk as seen from the tracking direction, is adjusted only by variation in said angle of incidence caused by the electric power supply to said coil.

As per the above, in the optical disk drive apparatus according to the present invention, adjustment of the angle of incidence is performed only by variation in the angle of incidence caused by the electric power supply to the coil. With this feature, it is possible to minimize the necessity of using conventional skew adjustment mechanisms utilizing a screw mechanism or a cam mechanism for adjusting the height of guide shafts (main shaft and sub-shaft) while making it possible to adjust the angle of incidence (e.g. degree of perpendicularity (or skew) in the radial direction or the tangential direction) of the light beam emitted from the objective lens to the irradiated surface of the disk to a specific target value or the like with a simple and low-cost structure, and with a simple operation and high accuracy. Therefore, it is possible, with the present invention, to make the optical disk drive apparatus compact, thin, lightweight or low cost.

In the above-described optical disk drive apparatus according to the present invention, the electric power supply to the coil may be performed based on an electric power supply control amount for the coil with which a predetermined angle of incidence would be attained.

In the above-described optical disk drive apparatus according to the present invention, said electric power supply control amount for the coil with which a predetermined angle of incidence would be attained may be determined in advance in such a way as to nullify a difference between a target value of the angle of incidence and an obtained value. (Here, the obtained value means information or value related to an actual angle of incidence that is obtained based on an output signal or the like from an optical pickup or a sensor for the angle of incidence etc. The term "obtained value" that will appear hereinafter in similar contexts also has the same meaning).

In the above-described optical disk drive apparatus according the present invention, the apparatus may be provided with setting means for setting said electric power supply control amount for the coil with which a predetermined angle of incidence would be attained, and the adjustment of the angle of incidence may be performed based on the electric power supply control amount set by the setting means.

With the above-described feature that setting means for setting (or, alternatively, storing) electric power supply control amount for the coil with which a predetermined angle of incidence would be attained is provided in the optical disk drive apparatus (alternatively, the setting means may be provided externally of the optical disk drive apparatus) and the electric power supply is controlled based on the electric power supply control amount stored in the setting means for adjusting the angle of incidence, it is possible to perform the electric power supply control through a so-called feedforward control to obtain a predetermined angle of incidence (e.g. skew) during the operation of the optical disk drive apparatus. Therefore, it is possible to realize, with a simple system, stable adjustment of the angle of incidence (e.g. skew) with small variation (such as hunting). This also means that the quality of recording or reproducing signal can be maintained high even during focus adjustment or tracking.

An optical disk drive apparatus according to the present invention comprises:

an objective lens which converges a light beam to direct it to an optical disk;

an objective lens support portion for supporting the objective lens on a chassis of the optical disk drive apparatus;

an elastic support member which movably supports the objective lens on the objective lens support portion;

a coil and a magnet, one of which is provided substantially integral with the objective lens and another of which is mounted on the objective lens support portion independently from the objective lens, the coil and the magnet being capable of moving, by an interaction of the coil and the magnet caused by supplying electric power to the coil, the objective lens against an elastic force of the elastic support member relative to the objective lens support portion so as to vary an angle of incidence of the light beam emitted from the objective lens with respect to an irradiated surface of the optical disk; and incident angle adjusting means for adjusting said angle of incidence by controlling electric power supply to the coil based on an electric power supply control amount for the coil with which a predetermined angle of incidence would be attained.

With this apparatus of the present invention, it is possible to tilt, by means of angle of incidence adjusting means, the objective lens with respect to the irradiated surface of the disk against an elastic force of an elastic support member by controlling electric power supply to a coil based on an electric power supply control amount for the coil with which a specific angle of incidence would be attained. So it is possible to adjust the angle of incidence (e.g. degree of perpendicularity (or skew) in the radial direction or the tangential direction) of the light beam emitted from the objective lens with respect to the irradiated surface of the disk to a specific target value or the like with a simple and low-cost structure, and with a simple operation and high accuracy.

Therefore, it is possible to minimize the necessity of using conventional skew adjustment mechanisms utilizing a screw mechanism or a cam mechanism for adjusting the height of guide shafts (main shaft and sub-shaft), so that variations in the distance from the optical pickup to the disk surface between the inner portion and the outer portion of the disk caused by the conventional skew adjustment would be suppressed. This means that the movable range of the movable portion of the objective lens can be reduced. So, it is possible, with the present invention to make optical disk drive apparatus compact, thin or lightweight.

Furthermore, in the apparatus according to the invention, a skew adjustment operation is easy to perform and the apparatus can be constructed with a smaller number of parts, as compared to conventional apparatus. Therefore, the present invention can enhance productivity, so that optical disk drive apparatus having high accuracy can be provided at low cost.

In the above-described optical disk drive apparatus according to the present invention, said electric power supply control amount for the coil with which a predetermined angle of incidence would be attained may be determined in advance in such a way as to nullify a difference between a target value of the angle of incidence and an obtained value.

In the above-described optical disk drive apparatus according to the present invention, the apparatus may be provided with setting means for setting said electric power supply control amount for the coil with which a predetermined angle of incidence would be attained so that the incident angle adjusting means may control the electric power supply to the coil based on the electric power supply control amount set by said setting means so as to adjust said angle of incidence.

With the above-described feature that setting means for setting (or, alternatively, storing) electric power supply control amount for the coil with which a predetermined angle of incidence would be attained is provided in the optical disk drive apparatus or in the incident angle adjusting means (alternatively, the setting means may be provided externally of the optical disk drive apparatus or the incident angle adjusting means) and the electric power supply is controlled by the incident angle adjusting means based on the electric power supply control amount stored in the setting means for adjusting the angle of incidence, it is possible to perform the electric power supply control through a so-called feedforward control to obtain a predetermined angle of incidence (e.g. skew). Therefore, it is possible to realize, with a simple system, stable adjustment of the angle of incidence (e.g. skew) with small variation (such as hunting). This also means that the quality of recording or reproducing signal can be maintained high even during focus adjustment or tracking.

In the above-described optical disk drive apparatus according to the present invention, the objective lens support portion may be so supported on the chassis of the optical disk drive apparatus as to be movable in a tracking direction, and said angle of incidence may be at least one of a radial direction tilt angle as a tilt angle of an optical axis with respect to the irradiated surface of the disk as seen from a direction perpendicular to a tracking direction and a tangential direction tilt angle as a tilt angle of the optical axis with respect to the irradiated surface of the disk as seen from the tracking direction.

It is preferable, in order to enhance signal quality, that the adjustment of the angle of incidence be performed for both the tilt angle in the radial direction and the tilt angle in the tangential direction. However, the adjustment is not necessarily required to be performed for both the tilt angles. With the above-described feature in which the adjustment of the angle of incidence is performed for at least one of the tilt angles, it is possible to make the movable range of the movable portion of the objective lens small, as compared to conventional apparatus. So, it is possible to make optical disk drive apparatus compact, thin or lightweight. In addition, with the above feature, the operation for the skew adjustment is facilitated, and that it is possible to enhance productivity. So, optical disk drive apparatus having high accuracy can be provided at low cost.

In connection with the above feature, it should be noted that the moving distance of the objective lens is larger in the tracking direction, and variations in the distance from the optical pickup to the disk surface between the inner portion and the outer portion of the disk caused by the skew adjustment is large in the tracking direction (see FIG. 12). So the above-mentioned advantages of the present invention are more effectively realized in the case in which the tilt angle is adjusted in accordance with the invention only in the radial direction as compared to the case in which the tilt angle is adjusted in accordance with the invention only in the tangential direction.

A method for manufacturing an optical disk drive apparatus according to the present invention is directed to the optical disk drive apparatus having:

an objective lens which converges a light beam to direct it to an optical disk;

an objective lens support portion for supporting said objective lens on a chassis of the optical disk drive apparatus;

an elastic support member which movably supports the objective lens on the objective lens support portion;

a coil and a magnet, one of which is provided substantially integral with the objective lens and another of which is mounted on the objective lens support portion independently from the objective lens, said coil and the magnet being capable of moving, by an interaction of the coil and the magnet caused by supplying electric power to the coil, the objective lens against an elastic force of the elastic support member relative to the objective lens support portion so as to vary an angle of incidence of the light beam emitted from the objective lens with respect to an irradiated surface of the optical disk; and incident angle adjusting means for adjusting said angle of incidence by controlling electric power supply to the coil based on an electric power supply control amount for the coil with which a predetermined angle of incidence would be attained;

and the manufacturing method comprises the steps of:

mounting an optical pickup composed of said objective lens, said objective lens support portion, said elastic support member, said coil and said magnet on a chassis of the optical disk drive apparatus;

obtaining information related to an angle of incidence of a light beam emitted from the objective lens of said optical pickup with respect to the irradiated surface of a disk for adjustment of the angle of incidence;

obtaining an electric power supply control amount for the coil with which a predetermined angle of incidence would be attained based on the obtained angle of incidence; and setting said incident angle adjusting means in such a way as to control electric power supply to said coil based on the obtained electric power supply control amount.

An optical pickup according to the present invention comprises:

an objective lens which converges a light beam to direct it to an optical disk;

an objective lens support portion for supporting the objective lens on a chassis of an optical disk drive apparatus;

an elastic support member which movably supports the objective lens on the objective lens support portion;

a coil and a magnet, one of which is provided substantially integral with the objective lens and another of which is mounted on the objective lens support portion independently from the objective lens, the coil and the magnet being capable of moving, by an interaction of the coil and the magnet caused by supplying electric power to the coil, the objective lens against an elastic force of the elastic support member relative to the objective lens support portion so as to vary an angle of incidence of the light beam emitted from the objective lens with respect to an irradiated surface of the optical disk; and incident angle adjusting means for adjusting said angle of incidence by controlling electric power supply to the coil based on an electric power supply control amount for the coil with which a predetermined angle of incidence would be attained.

This optical pickup of the present invention has the same advantages as the above-described optical disk drive apparatus according to the present invention. In addition, it is possible for e.g. a manufacturing corporation of the optical pickup to mount the optical pickup on an optical disk drive apparatus for test (i.e. for skew adjustment) and to adjust the angle of incidence before shipping (or at the time of assembling) of the optical pickup, so that the optical pickup that meets a standard of the manufacturing corporation would be shipped.

In the above-described optical pickup according to the present invention, said electric power supply control amount for the coil with which a predetermined angle of incidence would be attained may be determined in advance in such a way as to nullify a difference between a target value of the angle of incidence and an obtained value.

The above-described optical pickup according to the present invention may be provided with setting means for setting said electric power supply control amount for the coil with which a predetermined angle of incidence would be attained, and the incident angle adjusting means may control the electric power supply to said coil based on the electric power supply control amount set by said setting means so as to adjust said angle of incidence.

In the above-described optical pickup according to the present invention, the objective lens support portion may be so supported on the chassis of the optical disk drive apparatus as to be movable in a tracking direction, and said angle of incidence may be at least one of a radial direction tilt angle as a tilt angle of an optical axis with respect to the irradiated surface of the disk as seen from a direction perpendicular to a tracking direction and a tangential direction tilt angle as a tilt angle of the optical axis with respect to the irradiated surface of the disk as seen from the tracking direction.

It is preferable, in order to enhance signal quality, that the adjustment of the angle of incidence be performed for both the tilt angle in the radial direction and the tilt angle in the tangential direction. However, the adjustment is not necessarily required to be performed for both the tilt angles. With the above-described feature in which the adjustment of the angle of incidence is performed for at least one of the tilt angles, it is possible to make the movable range of the movable portion of the objective lens small, as compared to conventional apparatus. So, it is possible to make optical disk drive apparatus compact, thin or lightweight. In addition, with the above feature, the operation for the skew adjustment is facilitated, and that it is possible to enhance productivity. So, optical disk drive apparatus having high accuracy can be provided at low cost.

In connection with the above feature, it should be noted that the moving distance of the objective lens is larger in the tracking direction, and variations in the distance between the optical pickup and the disk surface between the inner portion and the outer portion of the disk caused by the skew adjustment is large in the tracking direction (see FIG. 12). So, the above-mentioned advantages of the present invention are more effectively realized in the case in which the tilt angle is adjusted in accordance with the invention only in the radial direction as compared to the case in which the tilt angle is adjusted in accordance with the invention only in the tangential direction.

An method for adjusting an optical pickup according to the present invention is directed to an optical pickup including:

an objective lens which converges a light beam to direct it to an optical disk;

an objective lens support portion for supporting the objective lens on a chassis of an optical disk drive apparatus;

an elastic support member which movably supports the objective lens on the objective lens support portion;

a coil and a magnet, one of which is provided substantially integral with the objective lens and another of which is mounted on the objective lens support portion independently from the objective lens, the coil and the magnet being capable of moving, by an interaction of the coil and the magnet caused by supplying electric power to the coil, the objective lens against an elastic force of said elastic support member relative to the objective lens support portion so as to vary an angle of incidence of the light beam emitted from the objective lens with respect to an irradiated surface of the optical disk; and incident angle adjusting means for adjusting the angle of incidence by controlling electric power supply to the coil based on an electric power supply control amount for the coil with which a predetermined angle of incidence would be attained;

the adjusting method comprising the steps of:

obtaining information related to an angle of incidence of a light beam emitted from the objective lens of said optical pickup mounted on a chassis for adjustment of the angle of incidence with respect to the irradiated surface of a disk for adjustment of the angle of incidence;

obtaining an electric power supply control amount for the coil with which a predetermined angle of incidence would be attained based on the obtained angle of incidence; and setting the incident angle adjusting means in such a way as to control electric power supply to said coil based on the obtained electric power supply control amount.

An optical pickup according to the present invention comprises:

an objective lens which converges a light beam to direct it to an optical disk;

an objective lens support portion for supporting the objective lens on a chassis of an optical disk drive apparatus;

an elastic support member which movably supports the objective lens on the objective lens support portion;

a coil and a magnet, one of which is provided substantially integral with the objective lens and another of which is mounted on the objective lens support portion independently from the objective lens, the coil and the magnet being capable of moving, by an interaction of the coil and the magnet caused by supplying electric power to the coil, the objective lens against an elastic force of the elastic support member relative to said objective lens support portion so as to vary an angle of incidence of the light beam emitted from the objective lens with respect to an irradiated surface of the optical disk; and incident angle adjusting means for adjusting said angle of incidence by controlling electric power supply to the coil based on an electric power supply control amount for the coil with which a predetermined angle of incidence would be attained;

wherein the optical pickup has been adjusted by a method for adjusting the pickup comprising the steps of:

obtaining information related to an angle of incidence of a light beam emitted from the objective lens of the optical pickup mounted on a chassis for adjustment of the angle of incidence with respect to the irradiated surface of a disk for adjustment of the angle of incidence;

obtaining an electric power supply control amount for the coil with which a predetermined angle of incidence would be attained based on the obtained angle of incidence; and setting the incident angle adjusting means in such a way as to control electric power supply to the coil based on the obtained electric power supply control amount.

These and other objects, features and advantages of the present invention will become more apparent upon consideration of the following description of the preferred embodiments of the present invention taken in conjunction with the accompanying drawings.

DETAILED DESCRIPTION OF THE PREFERRED EMBODIMENTS

In the following, an embodiment of the present invention will be specifically described with reference to the annexed drawings.

Figure 1:
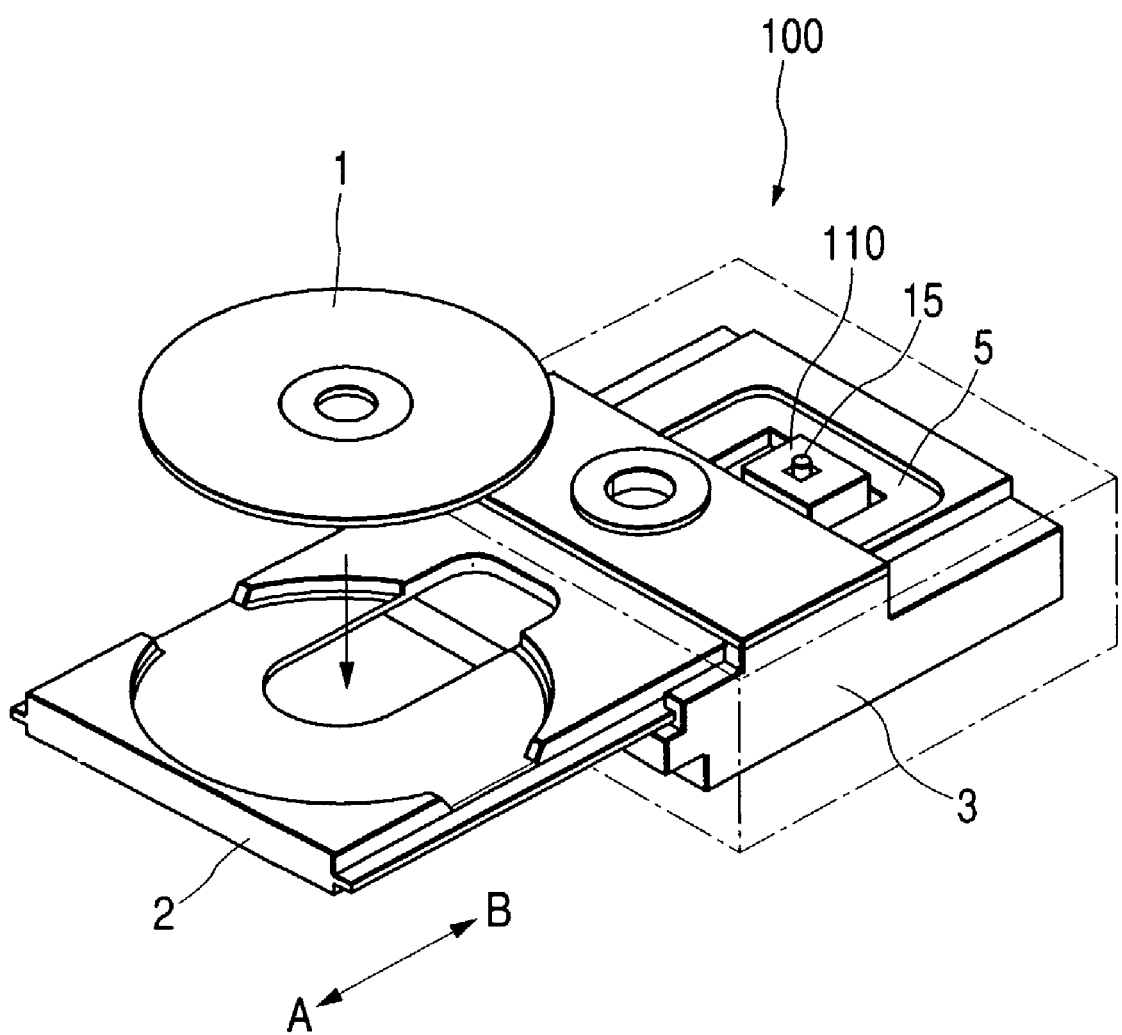
FIG. 1 is a perspective view showing the overall structure of an optical disk drive apparatus according to an embodiment of the present invention.

FIG. 1 shows an optical disk drive apparatus 100 according to an embodiment of the present invention. In the following descriptions and the related drawings, parts that are similar to those in the prior art apparatus shown in FIGS. 11 to 13 will be denoted with the same reference numerals as in FIG. 11 to 13, and the detailed descriptions thereof will be omitted.

Figure 2:
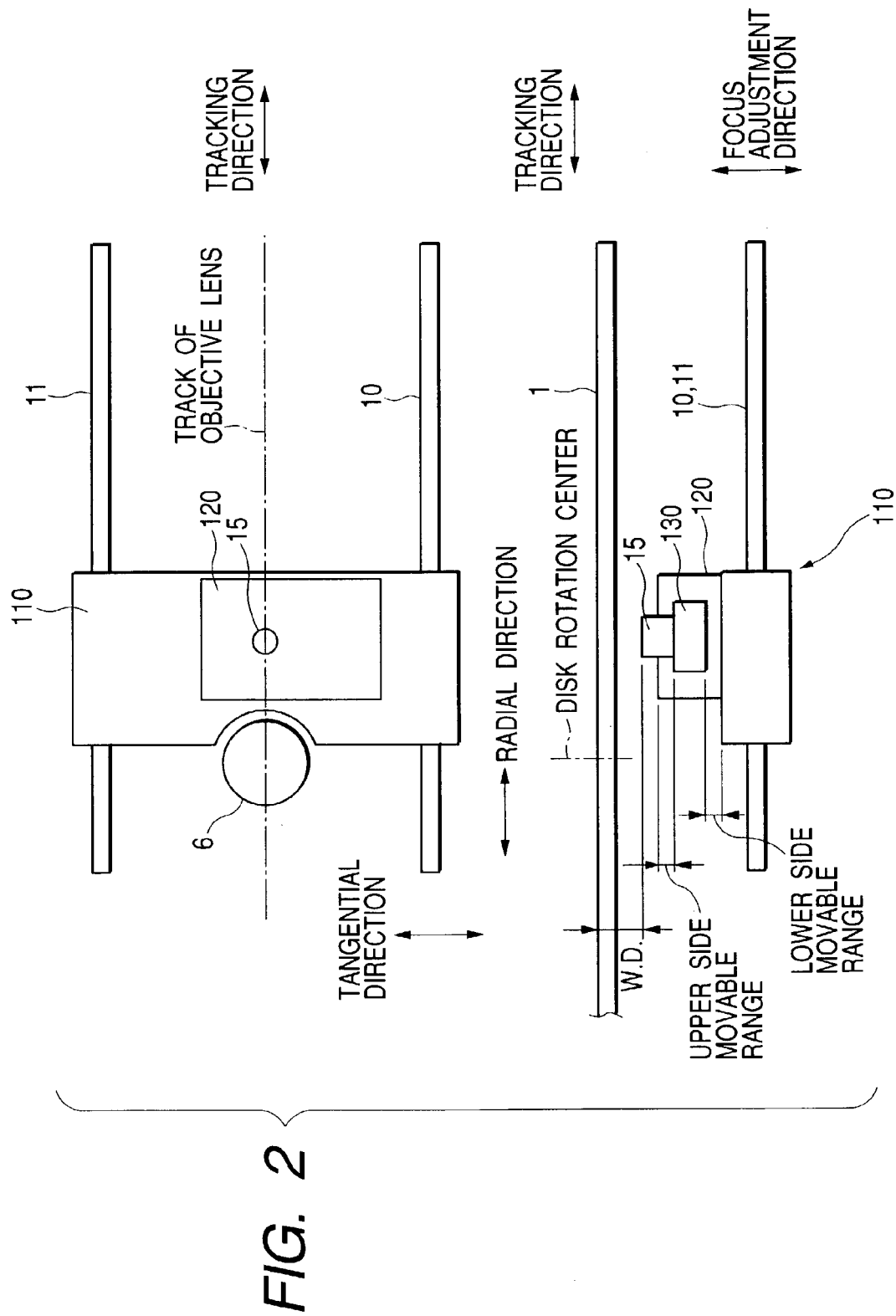
FIG. 2 is a drawing showing an example of an arrangement of an optical pickup and other parts in the optical disk drive apparatus shown in FIG. 1.
Figure 11:
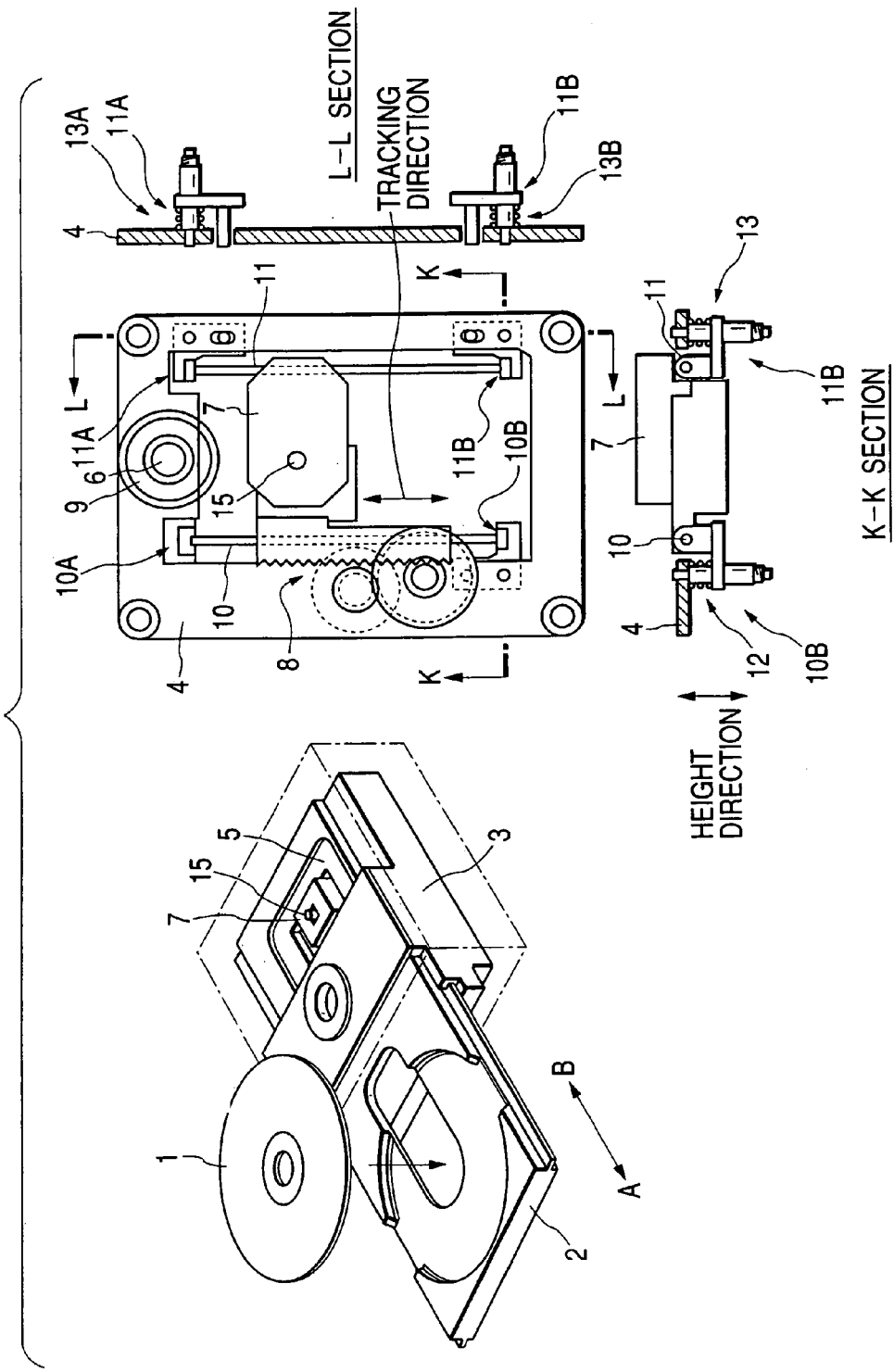
FIG. 11 is a drawing showing the overall structure of an optical disk drive apparatus according to a prior art.
Figure 12:
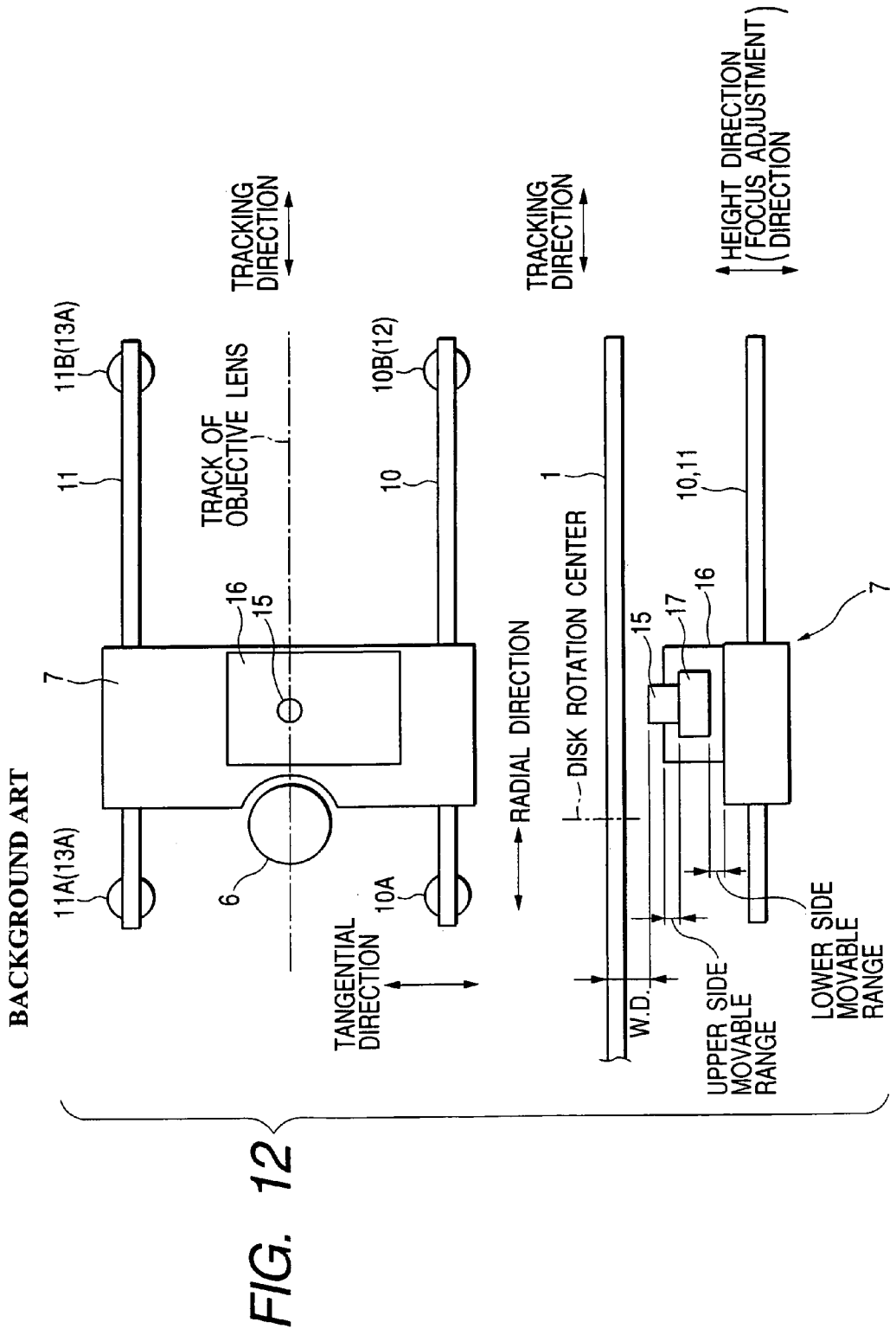
FIG. 12 is a drawing showing an arrangement of an optical pickup, a skew adjustment mechanism and other parts in the optical disk drive apparatus according to the prior art.
Figure 13:
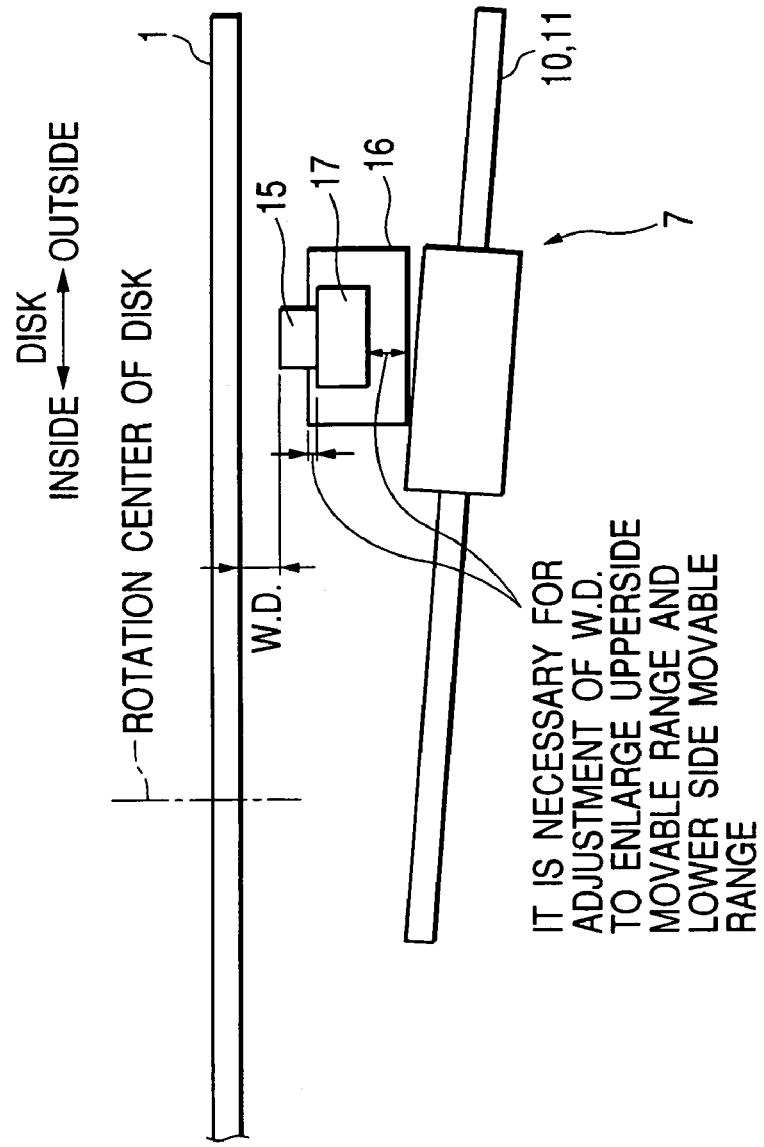
FIG. 13 is a drawing showing a status of the optical pickup after a skew adjustment operation in the optical disk drive apparatus according to the prior art.

The basic structure of the optical disk drive apparatus 100 according to this embodiment is substantially the same as the prior art apparatus shown in FIGS. 11 to 13. As shown in FIGS. 1 and 2, the optical disk drive apparatus 100 is provided with a tray 2 on which a disk 1 is to be placed, a main chassis 3, a mechanical unit 5 that includes a mechanical chassis 4, a disk motor 6, an optical pickup 110, a main shaft 10 and a sub-shaft 11. The structure of the optical pickup 110 (including an actuator 120 and a movable portion 130) and a skew adjusting operation in the optical disk drive apparatus 100 according to this embodiment are different from those in the prior art apparatus, and so those features will be specifically described in the following.

While in this embodiment an angle of incidence of a light beam emitted from an objective lens with respect to the irradiated surface (i.e. the recording surface side or its reverse side) of the disk is adjusted in terms of the degree of perpendicularity (or skew), the invention is not limited to the case in which the angle of incidence is adjusted to be perpendicular to the disk surface. Furthermore, while in this embodiment adjustment of the angle of incidence (e.g. skew adjustment) is performed with respect to a tangential direction and a radial direction, the invention is not limited to this, and the invention can be effectively applied to the case in which the adjustment is performed for only one of those directions. It is also possible to perform the adjustment of the angle of incidence as seen from a direction different from the above-mentioned directions by changing the positions of a coil and a magnet (which will be described later).

Figure 3:
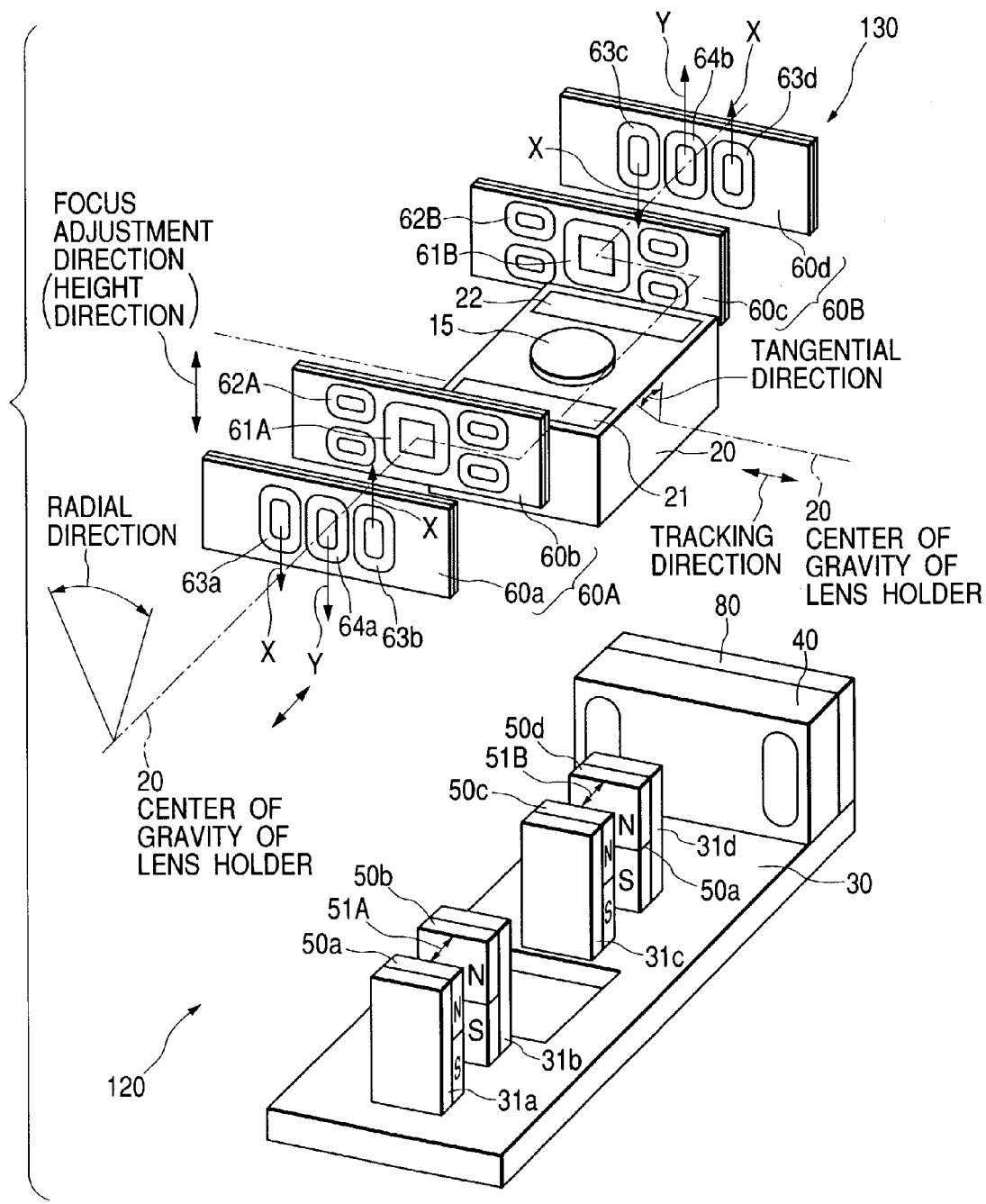
FIG. 3 is an assembly drawing for illustrating the structure of a movable portion of an actuator for the optical pickup of the optical disk drive apparatus.

FIG. 3 is an assembly drawing of the movable portion 130 of the actuator 120 that serves as a driving unit for the objective lens 15 of the optical pickup 110 used in the optical disk drive apparatus 100 according to the present embodiment. FIG. 3 shows an example of the movable portion 130 of the actuator according to this embodiment.

As shown in FIGS. 2 to 5, the movable portion 130 of the actuator 120 according to this embodiment includes the objective lens 15 for converging a light beam and directing it onto the optical disk 1 for an optical processing (e.g. recording or reproducing) and a lens holder 20 for holding the objective lens 15.

Figure 4:
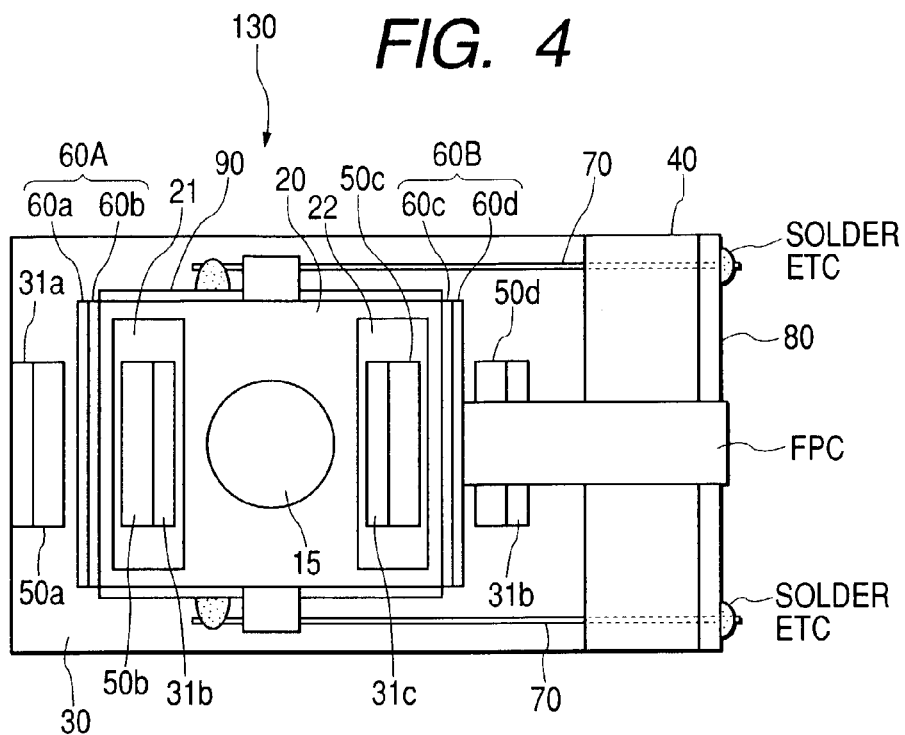
FIG. 4 is a drawing showing the structure of the movable portion of the actuator for the optical pickup of the optical disk drive apparatus shown in FIG. 1.
Figure 5:
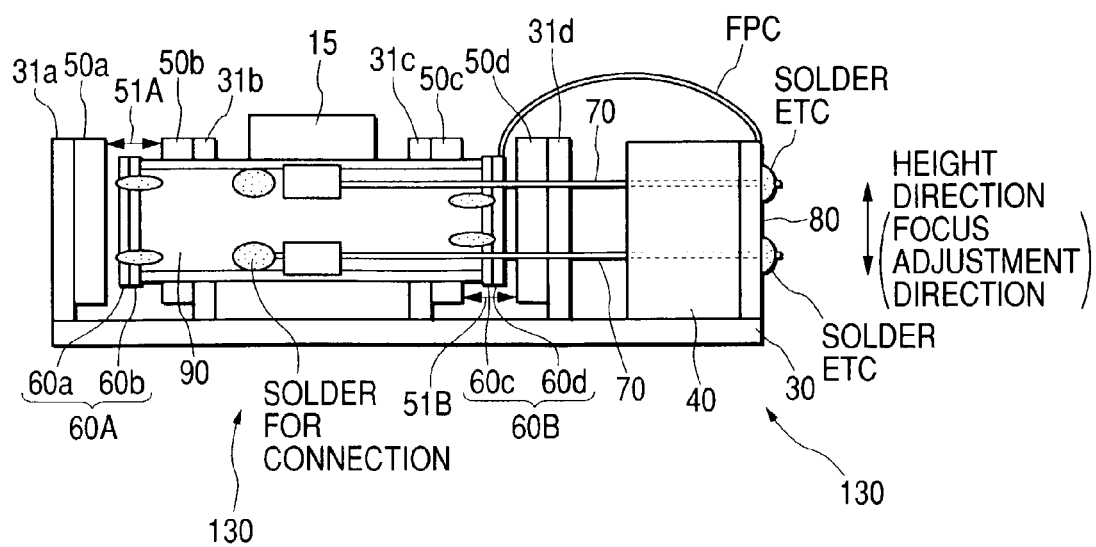
FIG. 5 is a side view of the movable portion of the actuator for the optical pickup show in FIG. 4.

As shown in FIGS. 4 and 5, one end of an resilient suspension wire 70 made of an elastic or resilient material is fixed to the lens holder 20. The other end of the suspension wire 70 is secured to a base plate by soldering etc. In other words, the lens holder 20 is cantilevered to the base plate 80 and a wire base 40 via the suspension wire 70 so that the lens holder 20 is resiliently supported so as to be movable relative to a fixed portion that includes a yoke base 30, the wire base 40, magnets 50a to 50d and the base plate 80. The suspension wire may be constituted by a plate spring, a coil spring or other elastic members such as elastic gum etc. These elastic members constitute an elastic support member of the present invention.

The lens holder 20 is provided with planar coils 60a to 60d as shown in FIGS. 3 to 5, wherein planar coils 60a and 60b constitute a coil unit 60A and the planar coils 60c and 60d constitute another coil unit 60B. The coil units 60A and 60B are supported on end portions of the lens holder in such a way as to sandwich the lens holder 20, as shown in FIGS. 3 to 5.

Four yokes 31a to 31d extending in the height direction (which coincides with a focus adjustment direction) are disposed on the yoke base 30. Magnets 50a and 50b, each of which is provided with two magnetic poles, facing each other are disposed on the opposed surfaces of the yokes 31a and 31b, and magnets 50c and 50d, each of which is provided with two magnetic poles, facing each other are disposed on the opposed surface of the yokes 31c and 31d.

The lens holder 20 has an opening 21 through which the yoke 31b and the magnet 50b supported thereon are to be inserted. The lens holder 20 also has an opening 22 through which the yoke 31c and the magnet 50c supported thereon are to be inserted. When the lens holder 20 is assembled to a predetermined position, the yoke 31b and the magnet 50b are inserted into and received by the opening 21 with a certain space from the inner surfaces of the opening 21, and the yoke 31c and the magnet 50c are inserted into and received by the opening 22 with a certain space from the inner surfaces of the opening 22.

The planar coils 60a and 60b (i.e. the coil unit 60A) is movably received, integrally with the lens holder 20, in a magnetic gap 51A formed between the magnets 50a and 50b, and the planar coils 60c and 60d (i.e. the coil unit 60B) is movably received, integrally with the lens holder 20, in a magnetic gap 51B formed between the magnets 50c and 50d.

As shown in FIG. 3, the planar coil 60b (60c) is provided with a focus coil 61A (61B) and a tracking coil 62A (62B), which are adapted to interact, when supplied with electric power (or current), with the magnet 50a and the magnet 50b (the magnet 50c and the magnet 50d) so as to generate driving forces in the focus adjustment direction and the tracking direction (both the directions are indicated in FIG. 3).

The planar coil 60a (60d) is provided with a radial tilt coil 63a and 63b (63c and 63d) for tilting the objective lens 20 in the radial direction for example, as shown in FIG. 3. The radial tilt coils 63a and 63b (63c and 63d) are adapted to be supplied with electric power or current to generate forces (see arrows X in FIG. 3) in the same direction with a rotation center at the center of gravity of the lens holder 20 as seen from the direction substantially perpendicular to the tracking direction, namely the radial tilt coils 63a and 63b (63c and 63d) generate moments with respect to a rotation center at the center of gravity of the lens holder 20 as seen from the direction substantially perpendicular to the tracking direction. As a result of equilibrium of these moments and the elastic forces (or restoring forces) of the suspension wires 70, it is possible to tilt the lens holder 20 along with the objective lens 15 in the radial direction by a desired angle and to maintain the lens holder 20 and the objective lens 15 at their tilted state.

Furthermore, for example, as shown in FIG. 3, the planar coil 60a (60d) is provided with a tangential tilt coil 64a (64b). The tangential tilt coil 64a (64b) is adapted to be supplied with electric power or current to generate a force (see arrow Y in FIG. 3) in the same direction with a rotation center at the center of gravity of the lens holder 20, as seen from the tracking direction, namely the tangential tilt coil 64a (64b) generates moments with respect to a rotation center at the center of gravity of the lens holder 20 as seen from the tracking direction. As a result of equilibrium of the moment and the elastic forces (or restoring forces) of the suspension wires 70, it is possible to tilt the lens holder 20 along with the objective lens 15 in the tangential direction by a desired angle and to maintain the lens holder 20 and the objective lens 15 at their tilted state.

As per the above, in the apparatus according to this embodiment, it is possible to adjust degree of perpendicularity (or skew) of the optical axis of the objective lens 15 relative to the irradiated surface of the disk 1 in the radial and tangential directions by controlling the electric power supply (or the generated moments) to the radial tilt coils 63a to 63d and the tangential tilt coils 64a and 64b.

An objective lens support portion of the present invention is constituted by an optical pickup body etc. for supporting the objective lens 15 on the chassis (i.e. main chassis 3 and mechanical chassis 4 etc.) of the optical disk drive apparatus 100 (namely, a body portion of the optical pickup for supporting the objective lens and the suspension wires etc.).

The planar coils 60a to 60d can be connected via a bridge board 90 using solder or the like as shown in FIGS. 4 and 5. The suspension wires 70 may be made of an electrically conductive material so that they would function as lead wires for supplying electric power or current to the coils as well as elastic members (or supports) for supporting the lens holder. In addition, electric power supply to the focus coils 61A and 61B and the tracking coils 62A and 62B provided on the planar coils 60b and 60c may be performed via the suspension wires 70 and the bridge board 90 etc. It would be apparent that the arrangement for supplying electric power to those coils is not limited to what is described above, and individual lead wires different from suspension wires may be provided separately for supplying power to the respective coils.

On the other hand, electric power supply to the radial tilt coils 63a to 63d and the tangential tilt coils 64a and 64b can be performed by connecting the planar coils 60b and 60c via the bridge board 90 and using a tilt coil power supply FPC (flexible printed circuit) that is connected to the planar coil 60d, as shown in FIGS. 4 and 5. However, the means for supplying electric power to the tilt coils is not limited to the above-mentioned tilt coil power supply FPC. For example, a plurality of suspension wires (e.g. four suspension wires) 70 may be added so that electric power would be supplied to the radial tilt coils 63a to 63d and the tangential tilt coils 64a and 64b via the added suspension wires and the bridge board 90.

Specifically, it is possible to arrange, for example, eight suspension wires 70 in all including two for supplying power to the focus coils (61A and 61B), two for supplying power to the tracking coils (62A and 62B), two for supplying power to the radial tilt coils (63*a* to 63*d*) and two for tangential tilt coils (64*a* and 64*b*).

In the following, examples of the skew adjustment in this embodiment will be described.

[Skew Adjustment for Optical Pickup Alone]

Figure 6:
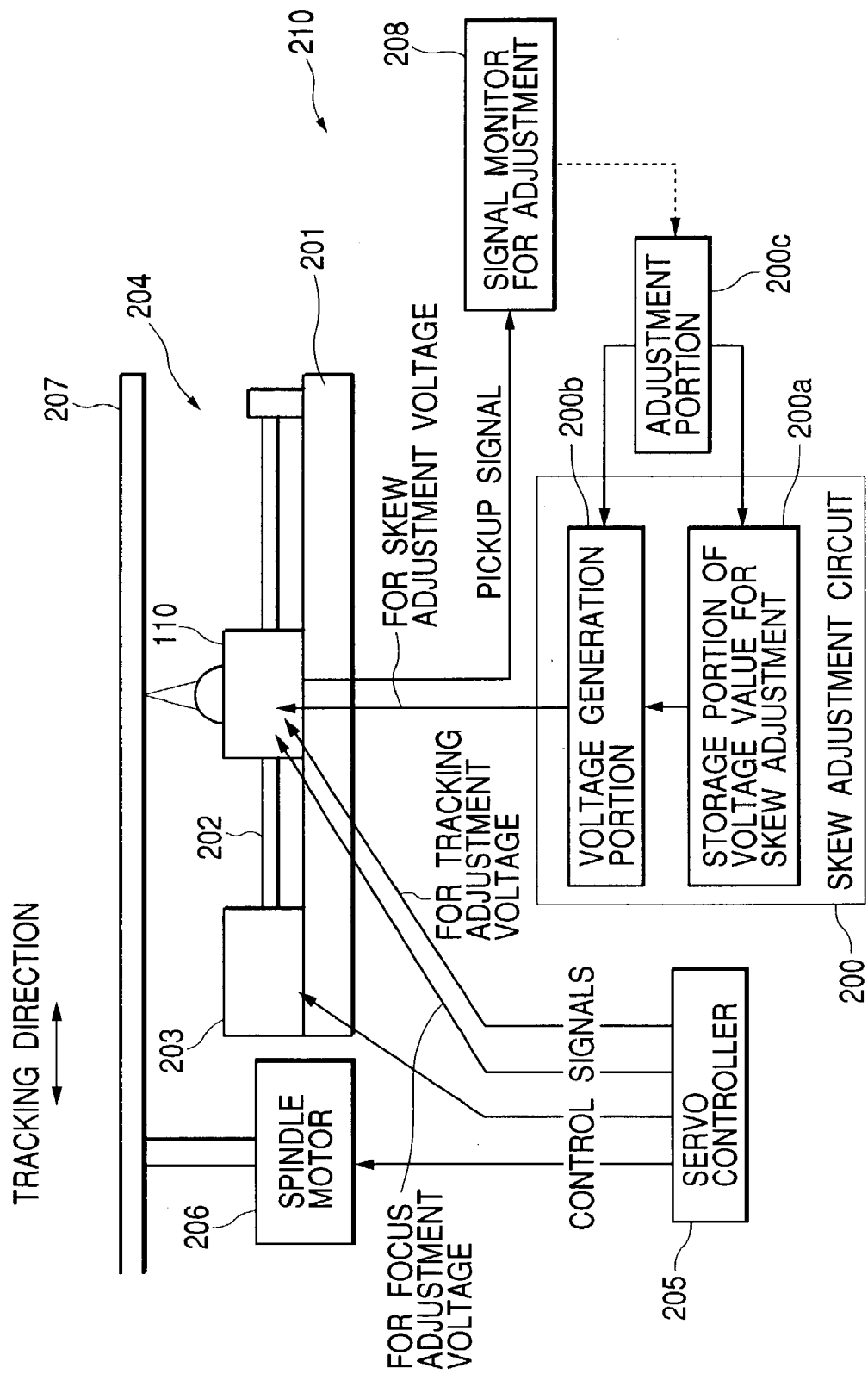
FIG. 6 is a diagram illustrating skew adjustment for the optical pickup alone in connection with the embodiment of the present invention.

A skew adjustment circuit 200 (indicated in the functional block diagram of FIG. 6) is provided in the optical pickup 110. The optical pickup 110 is set in a skew adjustment system 210 including an optical pickup feeding (or advancing) mechanism for skew adjustment 204 that has a support shaft for skew adjustment 202 and a feed motor for skew adjustment 203 used for moving the optical pickup 110 in the tracking direction, a servo controller for skew adjustment 205 that controls driving of various actuators, a disk motor (or spindle motor) for skew adjustment 206, disk for skew adjustment 207 and a signal monitor for adjustment 208 etc.

Under the state in which the driving of the optical pickup feed mechanism for skew adjustment 204 and the disk motor for skew adjustment 206 etc. is controlled in a predetermined manner by the servo controller for skew adjustment 205, an operator adjusts the skew adjustment circuit 200 by an adjustment portion 200*c*, while observing a pickup signal with the signal monitor for adjustment 208, in such a way as to attain a skew adjustment voltage at which the degree of perpendicularity (or skew) of the optical axis of the optical head relative to the disk surface would become a prescribed degree. The adjustment value is stored (or set) in a storage portion of voltage value for skew adjustment 200*a* in the skew adjustment circuit 200, and at the time of packaging or mounting etc., a skew adjustment voltage is generated based on the stored value, so that the prescribed skew will be attained. In connection with the skew adjustment, it would be apparently understood that the system can be so constructed that skew adjustment is performed in relation to tracking positions, by providing adjustment values corresponding to the tracking positions (this is also the case with the other skew adjustment processes described in the following).

It is also possible to arrange the system in such a way that the skew adjustment circuit is adjusted automatically by giving feedback to the skew adjustment circuit 200 so that a prescribed degree of perpendicularity (or skew) of the optical axis of the optical head relative to the disk surface would be attained, based on the pickup signal, without using the signal monitor for adjustment 208 (but not necessarily excluding the use of the signal monitor for adjustment).

In the above system, the skew adjustment circuit 200 constitutes incident angle adjusting means of the invention, and the storage portion of voltage value for skew adjustment constitutes setting means of the invention.

[Skew Adjustment for Optical Pickup Assembled in Mechanical Chassis]

In this case, the optical pickup 110 and the skew adjustment circuit 200 are set in the mechanical chassis 4 for packaging in which the optical pickup feed mechanism for packaging 8, the main shaft 10 and the sub-shaft 11 are packaged or mounted. The skew adjustment circuit 200 may be disposed either in the optical pickup 110 or on the mechanical chassis 4.

Figure 7:
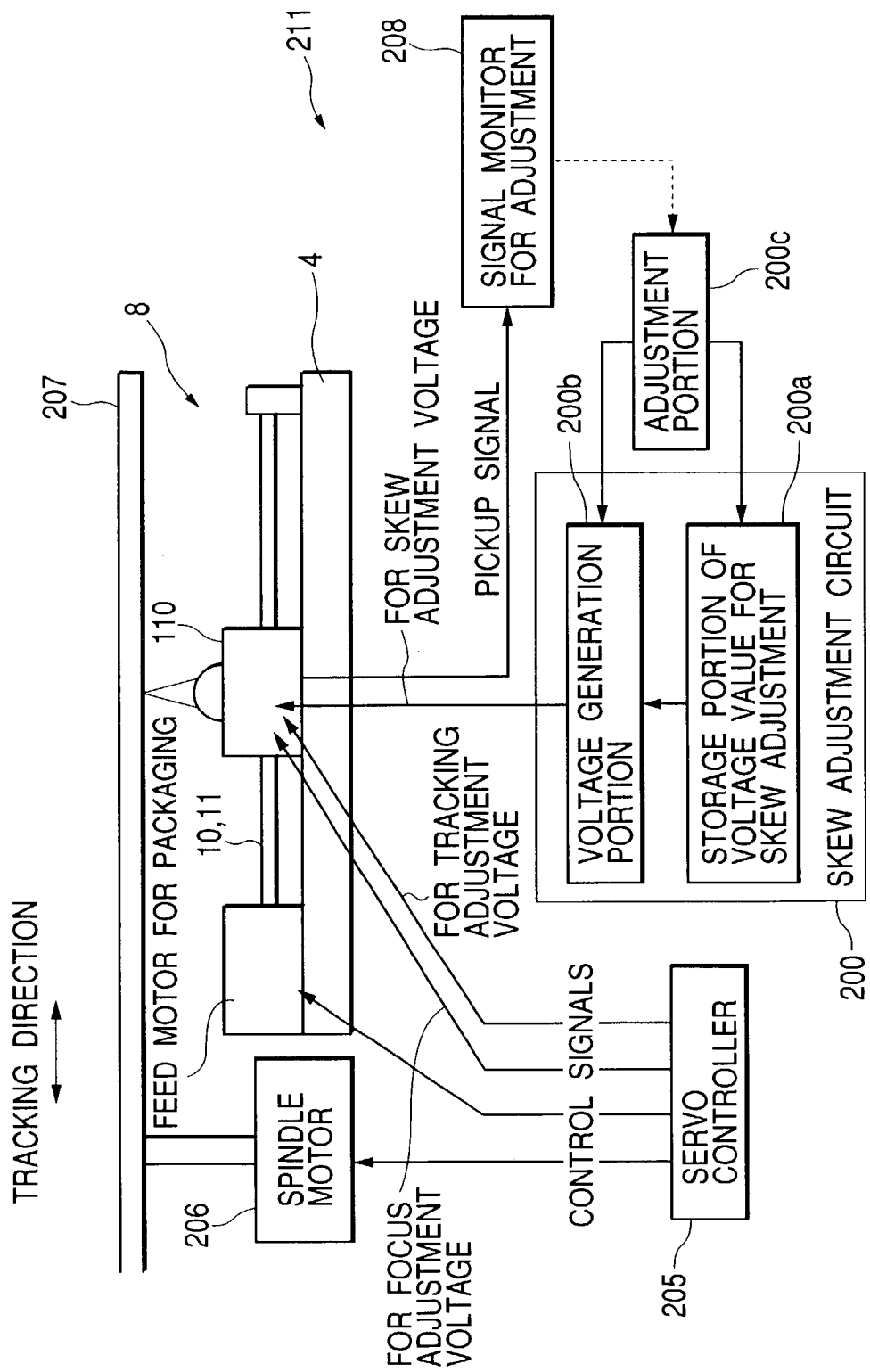
FIG. 7 is a diagram illustrating skew adjustment for the optical pickup assembled in a mechanical chassis in connection with the embodiment of the present invention.

The mechanical chassis 4 thus packaged is set in a skew adjustment system 211 including a servo controller for skew adjustment 205, a disk motor for skew adjustment 206, a disk for skew adjustment 207 and signal monitor for adjustment 208 etc., for example, as shown in FIG. 7.

Then, the skew adjustment circuit 200 is adjusted while observing the pickup signal with the monitor for adjustment 208 in a manner similar to the above process for the optical pickup alone. In connection with this process, it is also possible to arrange the system in such a way that the skew adjustment circuit 200 is adjusted automatically without (but not necessarily excluding) use of the signal monitor for adjustment 208 by giving feedback to the skew adjustment circuit 200.

[Skew Adjustment in Assembling Process of Optical Disk Drive Apparatus]

Figure 8:
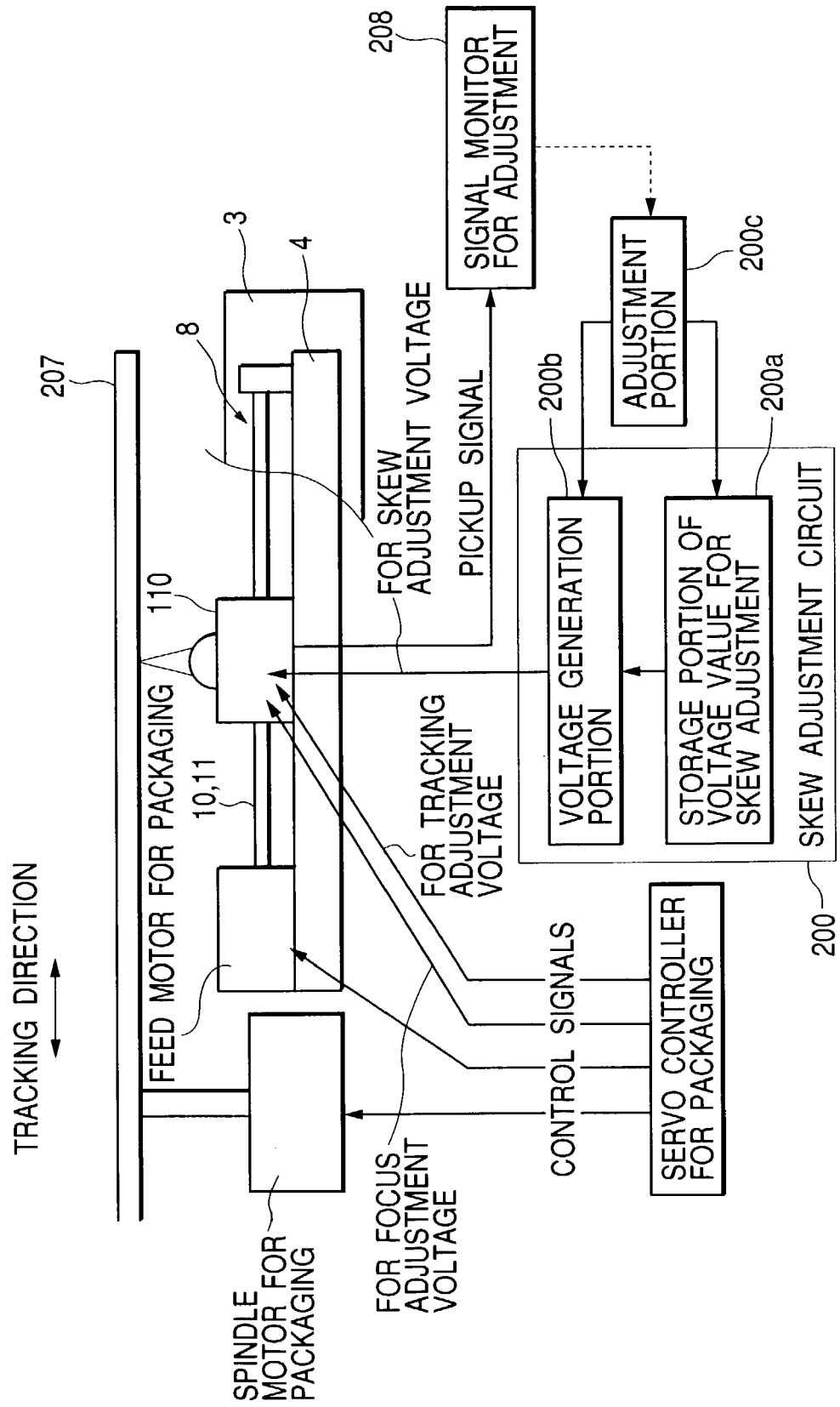
FIG. 8 is a diagram illustrating skew adjustment in an assembling process of the optical disk drive apparatus in connection with the embodiment of the present invention.

The skew adjustment under the manufacturing (or assembling) process of an optical disk drive apparatus, which would be performed at the manufacturing corporation etc., is effected after the optical pickup 110 and the skew adjustment circuit 200 are set in the mechanical chassis 4 in which the optical pickup feed mechanism 8, the main shaft 10 and the sub-shaft 11 have been packaged or mounted and the mechanical chassis 4 is assembled in the main chassis 3 of the optical disk drive apparatus (see FIG. 8).

The skew adjustment circuit 200 may be disposed at any place in the optical disk drive apparatus, but it is generally disposed on a main substrate (not shown) of the optical disk drive apparatus. While additional memory may be provided for the storage portion of voltage value for skew adjustment 200*a*, it is also possible to utilize a portion of other available memory provided in the apparatus as the storage portion of voltage value for skew adjustment 200*a*.

The skew adjustment circuit 200 is adjusted while observing the pickup signal with the monitor for adjustment 208 under the state in which the servo controller mounted in the optical disk drive apparatus is running in a predetermined manner.

As per the above, the structure of the skew adjustment system for this type of adjustment can be made simple, since the adjustment can be performed only by running the servo motor in a predetermined manner and providing means for transmitting the pickup signal to the signal monitor for adjustment 208. In connection with this process, it is also possible to arrange the system in such a way that the skew adjustment circuit is adjusted automatically without (but not necessarily excluding) use of the signal monitor for adjustment 208 by performing feedback control on the basis of the pickup signal.

While the skew adjustment circuit 200 may be so constructed as to be capable of adjusting the skew adjustment voltage fully electrically via the adjustment portion 200*c* etc., it may also be constructed to have a simpler structure by providing in the voltage generation portion 200*b* a variable resister that is capable of adjusting the skew voltage, to be manipulated for adjustment. The value of the variable resister is to be set to a resistance value after the adjustment of the skew, which means that the variable resister functions as the storage portion of voltage value for skew adjustment 200*a*. On the other hand, it is also possible to provide the storage portion of voltage value for skew adjustment 200*a* and the adjustment portion 200*c* externally of the skew adjustment circuit 200 so that the voltage generation portion would be operated through them.

As per the above, in this embodiment, the apparatus includes the radial tilt coils 63*a* to 63*d* for tilting the lens holder 20 along with the objective lens 15 in the radial direction, the tangential tilt coils 64*a* and 64*b* for tilting them in the tangential direction, the magnets 50*a* to 50*d*, the elastic members such as the suspension wires 70 and the skew adjustment circuit 200, wherein the lens holder 20 can be tilted, together with the objective lens 15, in the radial and tangential directions by controlling the power supply to the radial tilt coils 63a to 63d and the tangential tilt coils 64a and 64b. With the above structure, it is possible to adjust, with high accuracy, the degree of perpendicularity (or skew) in the radial and tangential directions with respect to the irradiated surface of the disk, of the light beam emitted from the objective lens 15 with a simple structure and a simple operation.

Therefore, it is possible to minimize the necessity of using conventional skew adjustment mechanisms (see elements 10A, 10B, 11A, 11B, 12, 13 etc. in FIGS. 11 and 12) that utilize a screw mechanism or a cam mechanism for adjusting the height of guide shafts (main shaft 10 and sub-shaft 11). So, it is possible to suppress variations in the distance from the optical pickup to the disk surface between the inner portion and the outer portion of the disk caused by the conventional skew adjustment, from which follows that the movable range of the objective lens moving portion (i.e. the movable portion 130 of the actuator 120) can be reduced. Therefore, it is possible to reduce the size and thickness of the optical pickup 110. In addition, in this embodiment, the skew adjusting operation is easy and the number of the parts required for the optical disk drive apparatus is small, as compared to the conventional apparatus. So it is possible to provide a simple and low-cost optical disk drive apparatus while maintaining high accuracy in skew adjustment.

Furthermore, in this embodiment, the storage portion of voltage value for skew adjustment 200a (or the variable resistor) along with the skew adjustment circuit 200 is additionally provided, and so the result of skew adjustment performed before or during the mounting of the optical pickup 110 to the optical disk drive apparatus can be stored in the storage portion of voltage value for skew adjustment 200a (or reflected in the variable resistor as a setting of the variable resistor), and a skew adjustment voltage in accordance with the result of the skew adjustment can be applied by so-called feedforward control during the operation of the optical disk drive apparatus. Therefore, it is possible to obtain stable skew with small variation (such as hunting) and to maintain the quality of recording or reproducing signal high even during transient states such as focus adjustment or tracking.

In this embodiment, adjustment of the angle of incidence is performed at the time of assembling the optical disk drive apparatus so as to obtain a result of the adjustment of the angle of incidence (i.e. an electric power supply control amount for the coils with which a specific angle of incidence would be attained) in advance, and the result of the adjustment is superimposed on an electric power supply control amount for the coils in a focus adjustment control process (which is a feedback control process) in a conventional manner or on an electric power supply control amount for the coils in a feedback process that is performed for compensating surface runout of the optical disk. Therefore, a focus adjustment control and a feedback control for compensating surface runout of the disk as well as a conventional tracking control (i.e. controlling of the sliding of the optical pickup in the tracking direction) are to be performed in a conventional manner.

Figure 10:
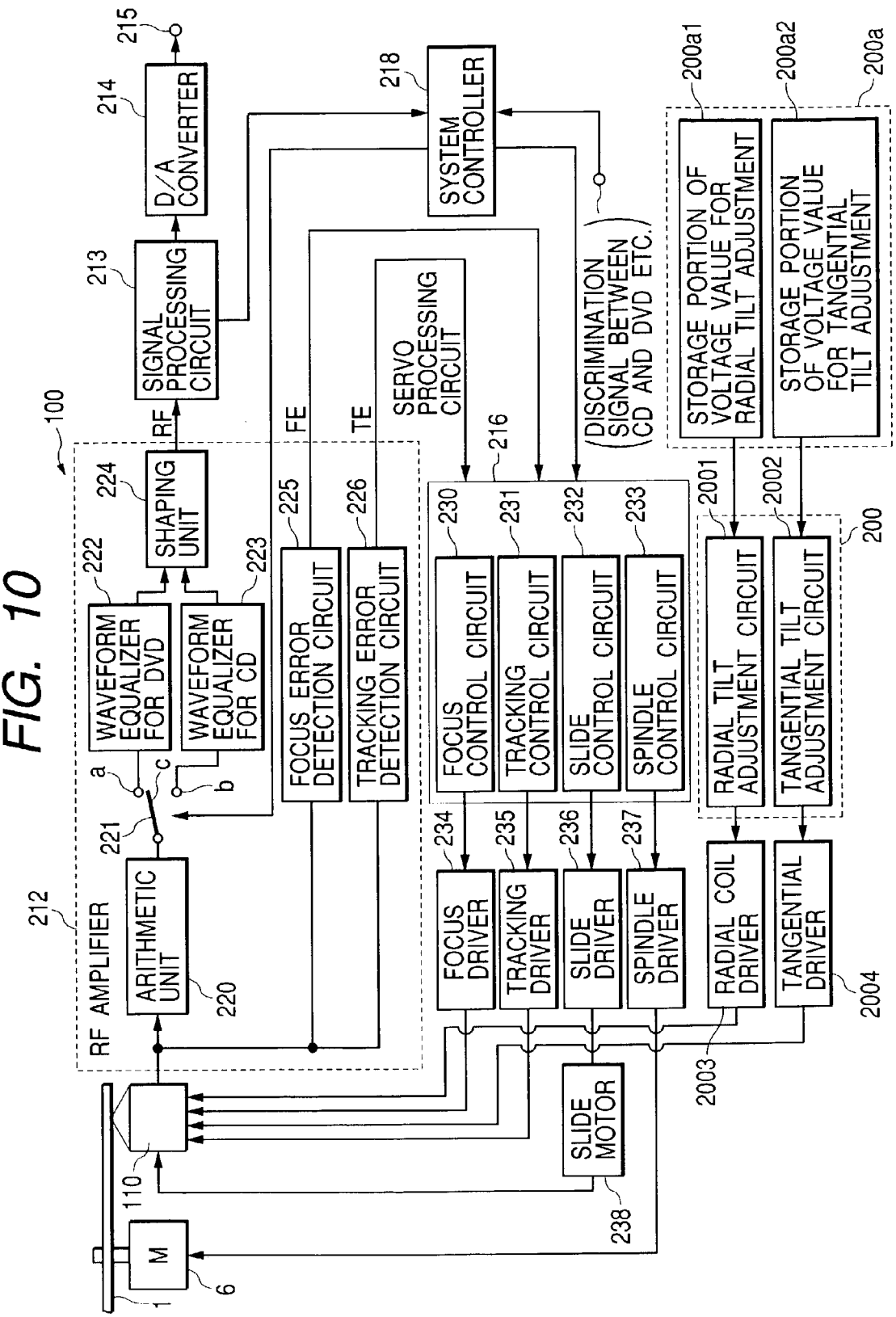
FIG. 10 is a functional block diagram schematically showing an example of a system of the optical disk drive apparatus according to the embodiment shown in FIG. 1

Therefore the optical disk drive apparatus according to this embodiment is provided with, as shown for example in FIG. 10, an RF amplifier 212 for obtaining a reproduction signal (RF signal), a focus error signal (FE) and a tracking error signal (TE) based on a pickup signal read out from the optical disk 1 by means of the optical pickup 110, a digital signal processing circuit 213 for reproducing data by performing processing such as demodulation and error detection/correction etc. on the RF signal from the RF amplifier 212, a D/A converter 214 for converting the data from the digital signal processing circuit 213 into an analogue signal to feed it to an output terminal 215, a servo processing circuit for performing a focusing servo, a tracking servo and sliding servo of the optical pickup based on the focus error signal and the tracking error signal and also controlling the rotation of the optical disk 1, a motor 6 for driving to rotate the optical disk 1 and a system controller 218 for controlling the above mentioned portions and also controlling feeding of the pickup signal to two waveform equalizers provided in the RF amplifier 212.

The RF amplifier 212 includes an arithmetic circuit 220 for generating an RF signal in a conventional manner based on e.g. four detection signals from a quarterly-divided optical detectors of the optical pickup 110, a switch 221 for switching the RF signal from the arithmetic unit 220 in accordance with a control by the system controller 218, a waveform equalizer for DVD 222 for correcting the waveform of the RF signal for DVD that is supplied by switching of the switch 221 so as to reduce waveform interference, a waveform equalizer for CD 223 for calculating the signal waveform of the RF signal for CD that is supplied by switching of the switch 221 via presuming by conventional classification application processing, a shaping unit 224 for shaping the RF signal from the waveform equalizer for DVD 222 or the waveform equalizer for CD 223 to convert it into a pulse signal representing presence/absence of signals, a focus error detection circuit 225 for detecting a focus error signal FE using a specific detection signal from the quarterly-divided optical detector and a tracking error detection circuit 226 for detecting a tracking error signal TE using a specific detection signal from the quarterly-divided optical detector.

The servo processing circuit 216 includes a focus control circuit 230, a tracking control circuit 231 and a slide control circuit 232 to supply a focus driver 234, a tracking driver 235 and a slide driver 236 with servo signals respectively for performing focusing servo, tracking servo and sliding servo of the optical pickup 110 based on the focus error signal and the tracking error signal etc. from the RF amplifier 212. The servo processing circuit also includes a spindle control circuit 233 to supply a spindle driver 237 with a spindle servo signal.

The focus driver 234 and the tracking driver 235 move the objective lens 15 of the optical pickup 110 in the focus direction and the tracking direction respectively in accordance with the respective servo signals from the servo processing circuit 216. The slide driver 236 slides or moves the optical pickup 110 in the tracking direction by means of a slide motor 238 of the optical pickup feed mechanism 8 in accordance with the slide servo signal. The spindle driver 237 controls the rotation of the spindle motor 6 in accordance with the spindle servo signal.

In addition to the above-described elements, as shown in FIG. 10, the optical disk drive apparatus according to this embodiment is further provided with the skew adjustment circuit 200 (which includes a radial tilt adjustment circuit 2001 and a tangential tilt adjustment circuit 2002) and adapted to apply, during the operation of the optical disk drive apparatus, the result of skew adjustment (the skew adjustment being performed before or during the mounting of the optical pickup 110 to the optical disk drive apparatus) that is stored in the storage portion of voltage value for skew adjustment 200a (which includes a storage portion of voltage value for radial tilt adjustment 200a1 and a storage portion of voltage value for tangential tilt adjustment 200a2) to the focus coils 61A and 61B and the tracking coils 62A and 62B in the optical pickup 110 by a feedforward control via a radial coil driver 2003 and a tangential coil driver 2004.

The present invention is not limited to the features that have been described in connection with the embodiment. For example, as shown in FIG. 9, the focus adjustment and the tilt driving in the tangential direction can also be performed by providing only planar coils 60b and 60c (without providing planar coils 60a and 60d) and arranging two focus coils 61A and 61B in such a way that they can be supplied with electric power separately (or independently) so that the torque (see e.g. arrows X1 in FIG. 9) about the center of gravity in the tracking direction generated in each coil can be adjusted while adjusting the focus.

Figure 9:
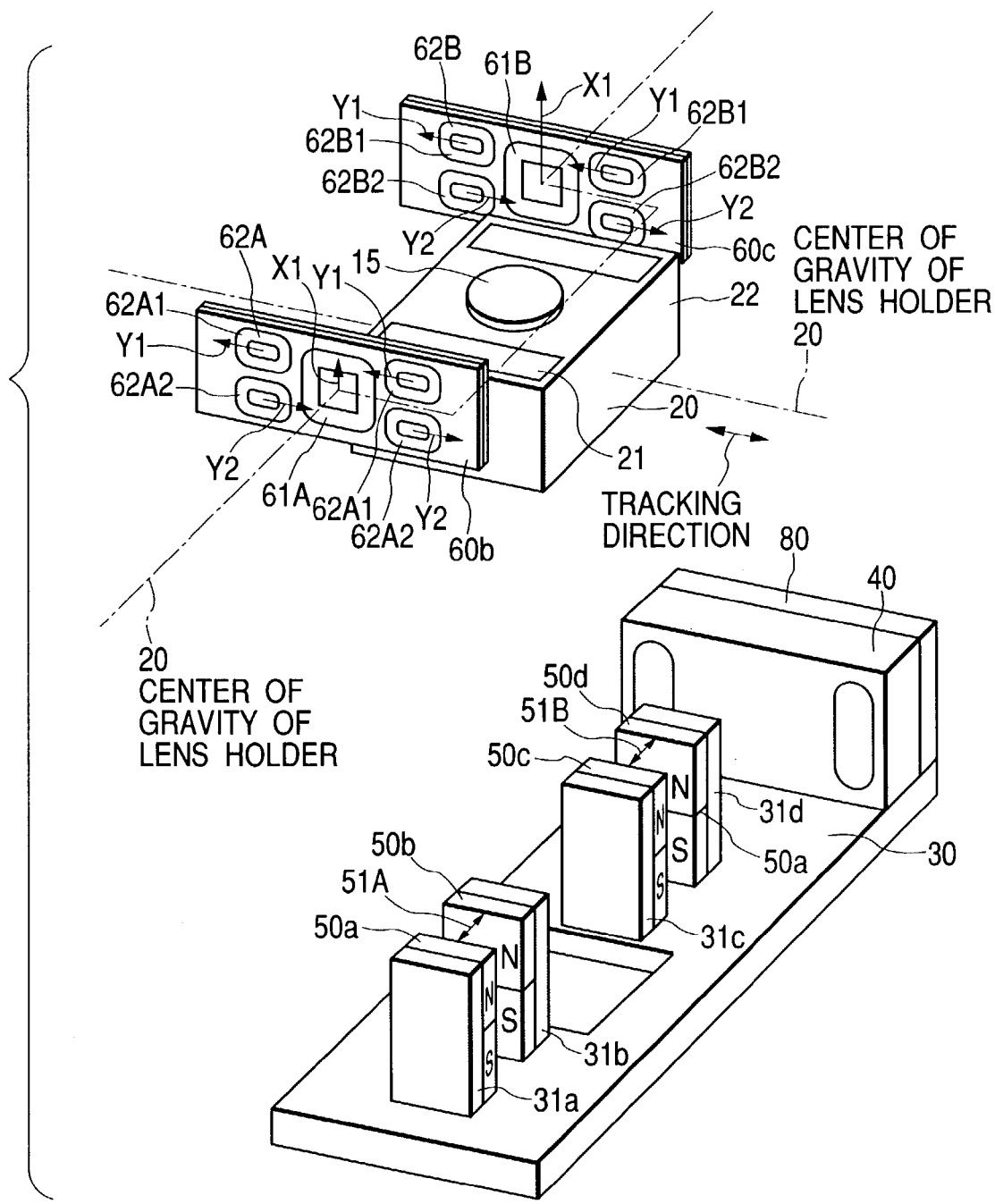
FIG. 9 is a drawing showing another example of the structure of the movable portion of the actuator for the optical pickup of the optical disk drive apparatus according to the embodiment shown in FIG. 1

Furthermore, as shown in FIG. 9, the tilt driving in the radial direction can also be performed by dividing the tracking coils 62A and 62B in the focus direction into two groups (coils 62A1, 62A2 and coils 62B1, 62B2) and arranging said tracking coil groups in such a way that the groups can be supplied with electric power separately (group by group) so that the torque (see e.g. arrows Y1 and Y2 in FIG. 9) about the center of gravity in the direction substantially perpendicular to the tracking direction generated in each coil can be adjusted. In this case also, power supply to two systems for supplying power to the focus coils 61A and 61B separately and two systems for supplying power to the two groups of the tracking coils 62A and 62B separately may be performed by means of suspension wires or an FTP or the like.

While in the above-described embodiment, the description have been made of the magnets each of which is provided with two magnetic poles, the present invention is not limited to that arrangement, and magnets that are provided with multiple magnetic poles such as three or four poles may also be used. Furthermore, while in the above-described embodiment, the description have been made of the structure that has four magnets 50a to 50d and the four yokes 31a to 31d, the present invention is not limited to that structure, and the inner magnets 50b and 50c and the inner yoke 31b and 31c may be omitted.

In connection with the present invention, it is possible to adopt both the conventional skew adjustment mechanism utilizing a screw mechanism or a cam mechanism or the like for adjusting the height of a guide shaft (see elements 10A, 10B, 11A, 11B, 12 and 13 shown in FIGS. 11 and 12) and the skew adjusting means that includes the radial tilt coils 63a to 63d for tilting the lens holder 20 together with the objective lens 15 in the radial direction, the tangential tilt coils 64a and 64b for tilting the lens holder 20 together with the objective lens 15 in the tangential direction, the magnets 50a to 50d, the elastic member such as suspension wires 70 and the skew adjustment circuit 200. It is also possible to use only the skew adjustment according to the invention (i.e. adjustment of the angle of incidence by supplying power to the coils) without providing the conventional skew adjustment mechanism.

In the above-described embodiment, an electric power supply amount for the coils with which a predetermined angle of incidence would be attained can be superimposed (in a manner of feedforward or as an offset amount) on an electric power supply control amount for the coils in a focus adjustment control process (which is a feedback control process) in a conventional manner or on an electric power supply control amount for the coils in a feedback process that is performed for compensating surface runout of the optical disk, though the present invention is not limited to that.

For example, it is also possible to arrange the system in such a way as to calculate a difference between a target angle of incidence and a value actually obtained based on the output (detection) signal of the optical pickup and to control the power supply to the coils by feedback so as to reduce said difference. In this case, if the control range of the feedback control is extended to angles to be covered by the conventional skew adjustment performed by adjusting the height of the guide shafts (main shaft and sub-shaft), it is possible to minimize necessity of using mechanisms such as a screw mechanism or a cam mechanism etc. In connection with this, in the case in which the feedback control range is extended to the skew adjustment angles, if the system is so arranged that the electric power supply amount is controlled by a control gain (such as a proportional gain, an integral gain or a derivative gain etc.) that can be variably set in accordance with said difference, it is possible to cause the angle of incidence to approach the target angle rapidly while meeting requirements for control stability and convergence etc.

It should be noted that since the planar coils and magnets according to the above-described embodiment are adapted to interact to each other by electric power supply to the coils, the dispositional relationship of the planar coils and the magnets are not limited to that of the embodiment, and other dispositions may be adopted as far as the same function and effect can be carried out. For example, the planar coils may be disposed on the part of the yoke base 30 while the magnets may be disposed on the part of the lens holder 20.

As per the above, according to the present invention, means for adjusting the angle of incidence can be constructed only by means for adjusting the angle of incidence by supplying electric power to coils. So it is possible to minimize the necessity of using conventional skew adjustment mechanisms utilizing a screw mechanism or a cam mechanism for adjusting the height of guide shafts (main shaft and sub-shaft) while making it possible to adjust the angle of incidence (e.g. degree of perpendicularity (or skew) in the radial direction or the tangential direction) of the light beam emitted from the objective lens with respect to (or relative to) the irradiated surface of the disk to a specific target value or the like with a simple and low-cost structure, and with a simple operation and high accuracy. Therefore, it is possible, with the present invention, to make optical disk drive apparatus compact, thin, lightweight or low cost.

According to the present invention, it is possible to tilt, by means of angle of incidence adjusting means, the objective lens with respect to the irradiated surface of the disk against an elastic force of an elastic support member by controlling electric power supply to a coil based on an electric power supply control amount for the coil with which a specific angle of incidence would be attained. So it is possible to adjust the angle of incidence (e.g. degree of perpendicularity (or skew) in the radial direction or the tangential direction) of the light beam emitted from the objective lens with respect to the irradiated surface of the disk to a specific target value or the like with a simple and low-cost structure, and with a simple operation and high accuracy.

Therefore, it is possible to minimize the necessity of using conventional skew adjustment mechanisms utilizing a screw mechanism or a cam mechanism for adjusting the height of guide shafts (main shaft and sub-shaft), so that variations in the distance from the optical pickup to the disk surface between the inner portion and the outer portion of the disk caused by the conventional skew adjustment would be suppressed. This means that the movable range of the movable portion of the objective lens can be reduced. So, it is possible, with the present invention to make optical disk drive apparatus compact, thin or lightweight.

Furthermore, in the apparatus according to the invention, a skew adjustment operation is easy to perform and the apparatus can be constructed with a smaller number of parts, as compared to conventional apparatus. Therefore, the present invention can enhance productivity of the apparatus, so that optical disk drive apparatus having high accuracy can be provided at low cost.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical disk drive apparatus comprising:
    an objective lens which converges a light beam to direct it to an optical disk;
    an objective lens support portion for supporting said objective lens on a chassis of the optical disk drive apparatus;
    an elastic support member which movably supports said objective lens on said objective lens support portion; and
    a coil and a magnet, one of which is provided substantially integral with said objective lens and another of which is mounted on said objective lens support portion independently from said objective lens, said coil and said magnet being capable of moving, by an interaction of the coil and the magnet caused by supplying electric power to the coil, said objective lens against an elastic force of said elastic support member relative to said objective lens support portion so as to vary an angle of incidence of the light beam emitted from said objective lens with respect to an irradiated surface of the optical disk;
    wherein, as said angle of incidence, at least one of a radial direction tilt angle as a tilt angle of an optical axis with respect to the irradiated surface of the disk as seen from a direction perpendicular to a tracking direction and a tangential direction tilt angle as a tilt angle of the optical axis with respect to the irradiated surface of the disk as seen from the tracking direction, is adjusted only by variation in said angle of incidence caused by the electric power supply to said coil.

2. An optical disk drive apparatus according to claim 1, wherein the electric power supply to said coil is performed based on an electric power supply control amount for the coil with which a predetermined angle of incidence would be attained.

3. An optical disk drive apparatus according to claim 2, wherein said electric power supply control amount for the coil with which a predetermined angle of incidence would be attained is determined in advance in such a way as to nullify a difference between a target value of the angle of incidence and an obtained value.

4. An optical disk drive apparatus according to claim 2 or 3 wherein the apparatus is provided with setting means for setting said electric power supply control amount for the coil with which a predetermined angle of incidence would be attained, and the adjustment of said angle of incidence is performed based on the electric power supply control amount set by said setting means.

5. An optical disk drive apparatus comprising:
    an objective lens which converges a light beam to direct it to an optical disk;
    an objective lens support portion for supporting said objective lens on a chassis of the optical disk drive apparatus;
    an elastic support member which movably supports said objective lens on said objective lens support portion;
    a coil and a magnet, one of which is provided substantially integral with said objective lens and another of which is mounted on said objective lens support portion independently from said objective lens, said coil and said magnet being capable of moving, by an interaction of the coil and the magnet caused by supplying electric power to the coil, said objective lens against an elastic force of said elastic support member relative to said objective lens support portion so as to vary an angle of incidence of the light beam emitted from said objective lens with respect to an irradiated surface of the optical disk; and
    incident angle adjusting means for adjusting said angle of incidence by controlling electric power supply to said coil based on an electric power supply control amount for the coil with which a predetermined angle of incidence would be attained.

6. An optical disk drive apparatus according to claim 5, wherein said electric power supply control amount for the coil with which a predetermined angle of incidence would be attained is determined in advance in such a way as to nullify a difference between a target value of the angle of incidence and an obtained value.

7. An optical disk drive apparatus according to claim 5 or 6 wherein the apparatus is provided with setting means for setting said electric power supply control amount for the coil with which a predetermined angle of incidence would be attained, and said incident angle adjusting means controls the electric power supply to said coil based on the electric power supply control amount set by said setting means so as to adjust said angle of incidence.

8. An optical disk drive apparatus according to claim 5, wherein said objective lens support portion is so supported on the chassis of the optical disk drive apparatus as to be movable in a tracking direction, and wherein said angle of incidence is at least one of a radial direction tilt angle as a tilt angle of an optical axis with respect to the irradiated surface of the disk as seen from a direction perpendicular to a tracking direction and a tangential direction tilt angle as a tilt angle of the optical axis with respect to the irradiated surface of the disk as seen from the tracking direction.

9. A method for manufacturing an optical disk drive apparatus, the apparatus having:
    an objective lens which converges a light beam to direct it to an optical disk;
    an objective lens support portion for supporting said objective lens on a chassis of the optical disk drive apparatus;
    an elastic support member which movably supports said objective lens on said objective lens support portion;
    a coil and a magnet, one of which is provided substantially integral with said objective lens and another of which is mounted on said objective lens support portion independently from said objective lens, said coil and said magnet being capable of moving, by an interaction of the coil and the magnet caused by supplying electric power to the coil, said objective lens against an elastic force of said elastic support member relative to said objective lens support portion so as to vary an angle of incidence of the light beam emitted from said objective lens with respect to an irradiated surface of the optical disk; and incident angle adjusting means for adjusting said angle of incidence by controlling electric power supply to said coil based on an electric power supply control amount for the coil with which a predetermined angle of incidence would be attained;

said method comprising the steps of:

mounting an optical pickup having said objective lens, said objective lens support portion, said elastic support member, said coil and said magnet on a chassis of the optical disk drive apparatus;

obtaining information related to an angle of incidence of a light beam emitted from the objective lens of said optical pickup with respect to the irradiated surface of a disk for adjustment of the angle of incidence;

obtaining an electric power supply control amount for the coil with which a predetermined angle of incidence would be attained based on the obtained information; and setting said incident angle adjusting means in such a way as to control electric power supply to said coil based on the obtained electric power supply control amount.

10. An optical pickup comprising:

an objective lens which converges a light beam to direct it to an optical disk;

an objective lens support portion for supporting said objective lens on a chassis of an optical disk drive apparatus;

an elastic support member which movably supports said objective lens on said objective lens support portion;

a coil and a magnet, one of which is provided substantially integral with said objective lens and another of which is mounted on said objective lens support portion independently from said objective lens, said coil and said magnet being capable of moving, by an interaction of the coil and the magnet caused by supplying electric power to the coil, said objective lens against an elastic force of said elastic support member relative to said objective lens support portion so as to vary an angle of incidence of the light beam emitted from said objective lens with respect to an irradiated surface of the optical disk; and incident angle adjusting means for adjusting said angle of incidence by controlling electric power supply to said coil based on an electric power supply control amount for the coil with which a predetermined angle of incidence would be attained.

11. An optical pickup according to claim 10, wherein said electric power supply control amount for the coil with which a predetermined angle of incidence would be attained is determined in advance in such a way as to nullify a difference between a target value of the angle of incidence and an obtained value.

12. An optical pickup according to claim 10 or 11 wherein the optical pickup is provided with setting means for setting said electric power supply control amount for the coil with which a predetermined angle of incidence would be attained, and said incident angle adjusting means controls the electric power supply to said coil based on the electric power supply control amount set by said setting means so as to adjust said angle of incidence.

13. An optical pickup according to claim 10, wherein said objective lens support portion is so supported on the chassis of the optical disk drive apparatus as to be movable in a tracking direction, and wherein said angle of incidence is at least one of a radial direction tilt angle as a tilt angle of an optical axis with respect to the irradiated surface of the disk as seen from a direction perpendicular to a tracking direction and a tangential direction tilt angle as a tilt angle of the optical axis with respect to the irradiated surface of the disk as seen from the tracking direction.

14. A method for adjusting an optical pickup, the optical pickup including:

an objective lens which converges a light beam to direct it to an optical disk;

an objective lens support portion for supporting said objective lens on a chassis of an optical disk drive apparatus;

an elastic support member which movably supports said objective lens on said objective lens support portion;

a coil and a magnet, one of which is provided substantially integral with said objective lens and another of which is mounted on said objective lens support portion independently from said objective lens, said coil and said magnet being capable of moving, by an interaction of the coil and the magnet caused by supplying electric power to the coil, said objective lens against an elastic force of said elastic support member relative to said objective lens support portion so as to vary an angle of incidence of the light beam emitted from said objective lens with respect to an irradiated surface of the optical disk; and incident angle adjusting means for adjusting said angle of incidence by controlling electric power supply to said coil based on an electric power supply control amount for the coil with which a predetermined angle of incidence would be attained;

said method comprising the steps of:

obtaining information related to an angle of incidence of a light beam emitted from the objective lens of said optical pickup mounted on a chassis for adjustment of the angle of incidence with respect to the irradiated surface of a disk for adjustment of the angle of incidence;

obtaining an electric power supply control amount for the coil with which a predetermined angle of incidence would be attained based on the obtained information; and setting said incident angle adjusting means in such a way as to control electric power supply to said coil based on the obtained electric power supply control amount.

15. An optical pickup comprising:

an objective lens which converges a light beam to direct it to an optical disk;

an objective lens support portion for supporting said objective lens on a chassis of an optical disk drive apparatus;

an elastic support member which movably supports said objective lens on said objective lens support portion;

a coil and a magnet, one of which is provided substantially integral with said objective lens and another of which is mounted on said objective lens support portion independently from said objective lens, said coil and said magnet being capable of moving, by an interaction of the coil and the magnet caused by supplying electric power to the coil, said objective lens against an elastic force of said elastic support member relative to said objective lens support portion so as to vary an angle of incidence of the light beam emitted from said objective lens with respect to an irradiated surface of the optical disk; and incident angle adjusting means for adjusting said angle of incidence by controlling electric power supply to said coil based on an electric power supply control amount for the coil with which a predetermined angle of incidence would be attained;

wherein said optical pickup has been adjusted by a method for adjusting the pickup comprising the steps of:

obtaining information related to an angle of incidence of a light beam emitted from the objective lens of said optical pickup mounted on a chassis for adjustment of the angle of incidence with respect to the irradiated surface of a disk for adjustment of the angle of incidence;

obtaining an electric power supply control amount for the coil with which a predetermined angle of incidence would be attained based on the obtained information; and setting said incident angle adjusting means in such a way as to control electric power supply to said coil based on the obtained electric power supply control amount.

* * * * *